US011882535B2

(12) United States Patent
Nimbalker et al.

(10) Patent No.: US 11,882,535 B2
(45) Date of Patent: Jan. 23, 2024

(54) RESOURCE PARTITIONING FOR PRE-EMPTION INDICATION

(71) Applicant: Apple Inc., Cupertino, CA (US)

(72) Inventors: Ajit Nimbalker, Fremont, CA (US); Debdeep Chatterjee, San Jose, CA (US); Jeongho Jeon, San Jose, CA (US); Fatemeh Hamidi-Sepehr, Milpitas, CA (US); Sergey Panteleev, Nizhny Novgorod (RU); Gang Xiong, Beaverton, OR (US); Alexey Vladimirovich Khoryaev, Nizhny Novgorod (RU); Mikhail Shilov, Nizhny Novgorod (RU); Sergey Sosnin, Zavolzhie (RU); Andrey Chervyakov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/950,578

(22) Filed: Sep. 22, 2022

(65) Prior Publication Data
US 2023/0040507 A1    Feb. 9, 2023

Related U.S. Application Data

(63) Continuation of application No. 17/185,623, filed on Feb. 25, 2021, now Pat. No. 11,678,278, which is a (Continued)

(51) Int. Cl.
*H04W 4/00* (2018.01)
*H04W 56/00* (2009.01)
(Continued)

(52) U.S. Cl.
CPC .......... *H04W 56/001* (2013.01); *H04L 5/001* (2013.01); *H04L 5/0048* (2013.01); *H04W 4/40* (2018.02);
(Continued)

(58) Field of Classification Search
None
See application file for complete search history.

(56) References Cited

U.S. PATENT DOCUMENTS

2011/0194523 A1    8/2011   Chung et al.
2016/0218849 A1    7/2016   Bertrand et al.
(Continued)

*Primary Examiner* — Zewdu A Beyen
(74) *Attorney, Agent, or Firm* — Kowert, Hood, Munyon, Rankin & Goetzel, P.C.

(57) ABSTRACT

Embodiments of a User Equipment (UE), Generation Node-B (gNB) and methods of communication are disclosed herein. The UE may attempt to decode sidelink synchronization signals (SLSSs) received on component carriers (CCs) of a carrier aggregation. In one configuration, synchronization resources for SLSS transmissions may be aligned across the CCs at subframe boundaries in time, restricted to a portion of the CCs, and restricted to a same sub-frame. The UE may, for multiple CCs, determine a priority level for the CC based on indicators in the SLSSs received on the CC. The UE may select, from the CCs on which one or more SLSSs are decoded, the CC for which the determined priority level is highest. The UE may determine a reference timing for sidelink communication based on the one or more SLSSs received on the selected CC.

20 Claims, 23 Drawing Sheets

Related U.S. Application Data continuation of application No. 16/181,808, filed on Nov. 6, 2018, now Pat. No. 10,979,988.

(60) Provisional application No. 62/587,200, filed on Nov. 16, 2017, provisional application No. 62/584,631, filed on Nov. 10, 2017, provisional application No. 62/582,841, filed on Nov. 7, 2017.

(51) Int. Cl.
| | | |
|---|---|---|
| *H04L 5/00* | (2006.01) | |
| *H04W 4/40* | (2018.01) | |
| *H04W 72/23* | (2023.01) | |
| *H04W 88/02* | (2009.01) | |

(52) U.S. Cl.
CPC ........... *H04W 72/23* (2023.01); *H04L 5/0005* (2013.01); *H04L 5/0007* (2013.01); *H04L 5/0051* (2013.01); *H04L 5/0094* (2013.01); *H04L 5/0098* (2013.01); *H04W 88/02* (2013.01)

(56) References Cited

U.S. PATENT DOCUMENTS

| | | |
|---|---|---|
| 2017/0127442 A1 | 5/2017 | Sun et al. |
| 2018/0034585 A1 | 2/2018 | Kim et al. |
| 2018/0035409 A1 | 2/2018 | Chmiel et al. |
| 2018/0049142 A1* | 2/2018 | Yang ..................... H04L 5/0048 |
| 2018/0063749 A1 | 3/2018 | Islam et al. |
| 2018/0098322 A1* | 4/2018 | Yoon ................. H04W 56/0005 |
| 2018/0103441 A1* | 4/2018 | Lim .................... H04B 7/0452 |
| 2018/0324882 A1* | 11/2018 | Gulati .................. H04W 72/23 |

\* cited by examiner

1400

1450

1600

1650

1700

1750

RESOURCE PARTITIONING FOR PRE-EMPTION INDICATION

PRIORITY CLAIM

This application is a continuation of U.S. Ser. No. 17/185,623, filed Feb. 25, 2021, which is a continuation of U.S. patent application Ser. No. 16/181,808, filed Nov. 6, 2018, titled "Methods of Limited Buffer Rate-Matching (LBRM), Pre-emption, and Sidelink Synchronization in New Radio (NR) Systems", which claims the benefit of priority under 35 U.S.C. 119(e) to U.S. Provisional Patent Application Ser. No. 62/582,841, filed Nov. 7, 2017, and to U.S. Provisional Patent Application Ser. No. 62/584,631, filed Nov. 10, 2017, and to U.S. Provisional Patent Application Ser. No. 62/587,200, filed Nov. 16, 2017. All the aforementioned Applications are incorporated by reference herein in their entireties.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to wireless communications. Some embodiments relate to cellular communication networks including 3GPP (Third Generation Partnership Project) networks, 3GPP LTE (Long Term Evolution) networks, 3GPP LTE-A (LTE Advanced) networks, New Radio (NR) networks, and 5G networks, although the scope of the embodiments is not limited in this respect. Some embodiments relate to limited buffer rate-matching (LBRM). Some embodiments relate to pre-emption. Some embodiments relate to vehicle-to-vehicle (V2V) communication. Some embodiments relate to sidelink communication.

BACKGROUND

Base stations and mobile devices operating in a cellular network may exchange data. As demand for mobile services and high data rates increases, various challenges related to reliability and capacity may arise. In an example scenario, a large number of users may demand access to the network, which may result in an increase in overhead and a corresponding decrease in overall efficiency. In another example scenario, a target latency for a user and/or application may be relatively low, and it may be challenging for the system to deliver in an efficient manner. Accordingly, there is a general need for methods and systems to implement communication between the base station and the mobile devices in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
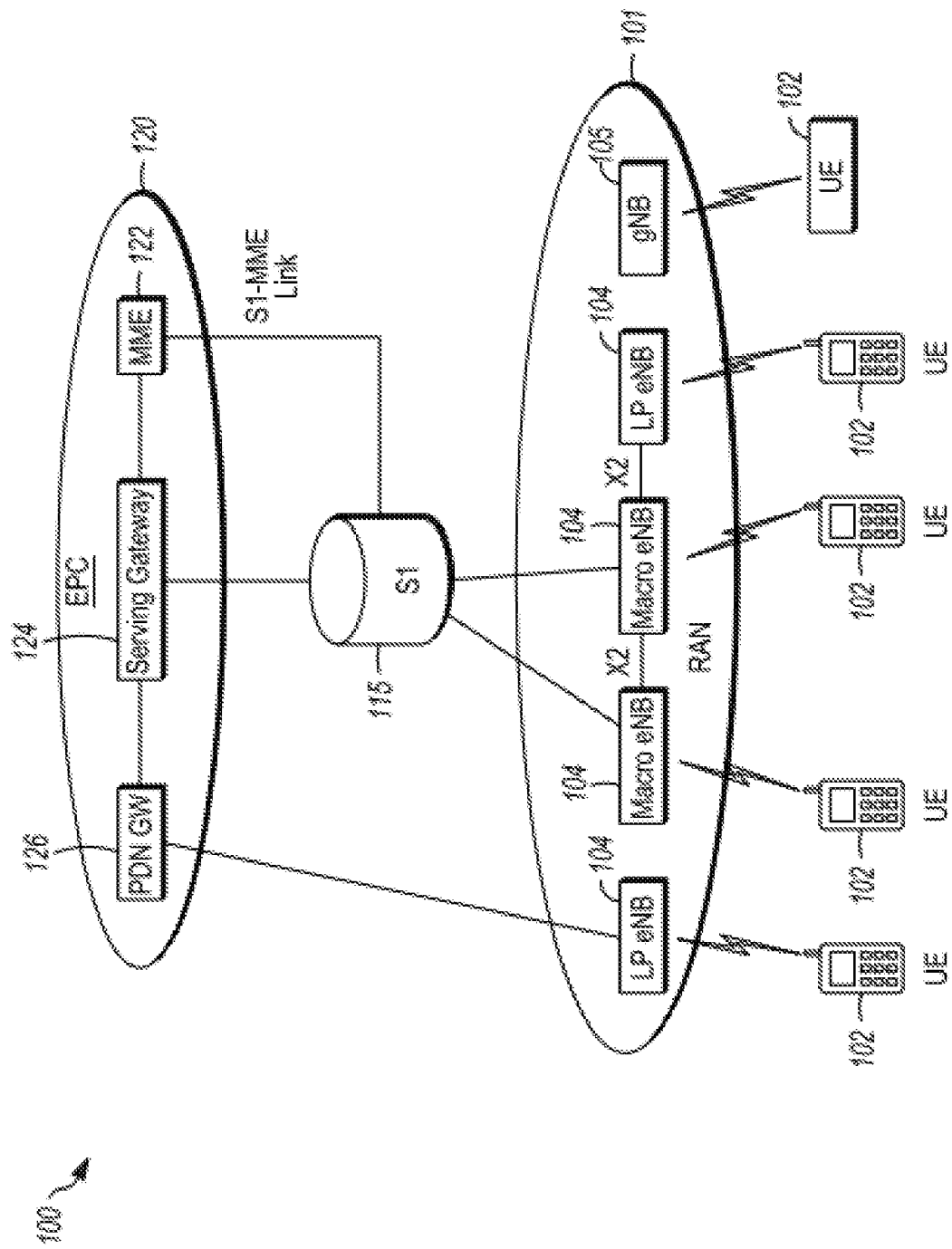
FIG. 1A is a functional diagram of an example network in accordance with some embodiments.
Figure 1B:
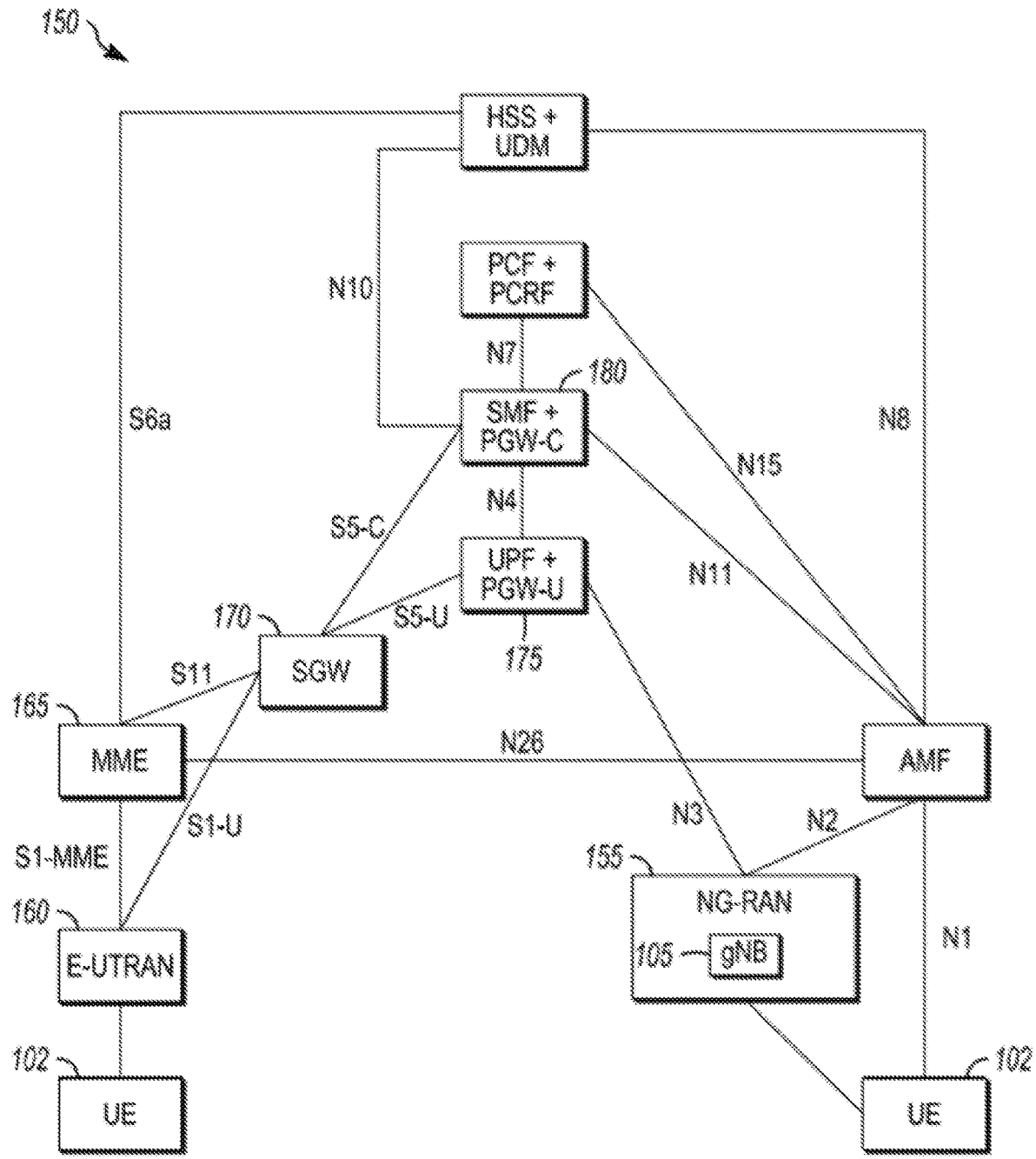
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, gNBs 105, and/or eNBs 104 may be configured to operate in accordance with an NR protocol and/or NR techniques. References to a UE 102, eNB 104, and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs I02 may be configured to communicate Orthogonal Frequency Division Multiplexing (OFDM) communication signals with an eNB 104 and/or gNB 105 over a multi carrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The SI interface 115 is the interface that separates the RAN 101 and the EPC 120. It may be split into two parts: the S1-U, which carries traffic data between the eNBs 104 and the serving GW 124, and the SI-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 105 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
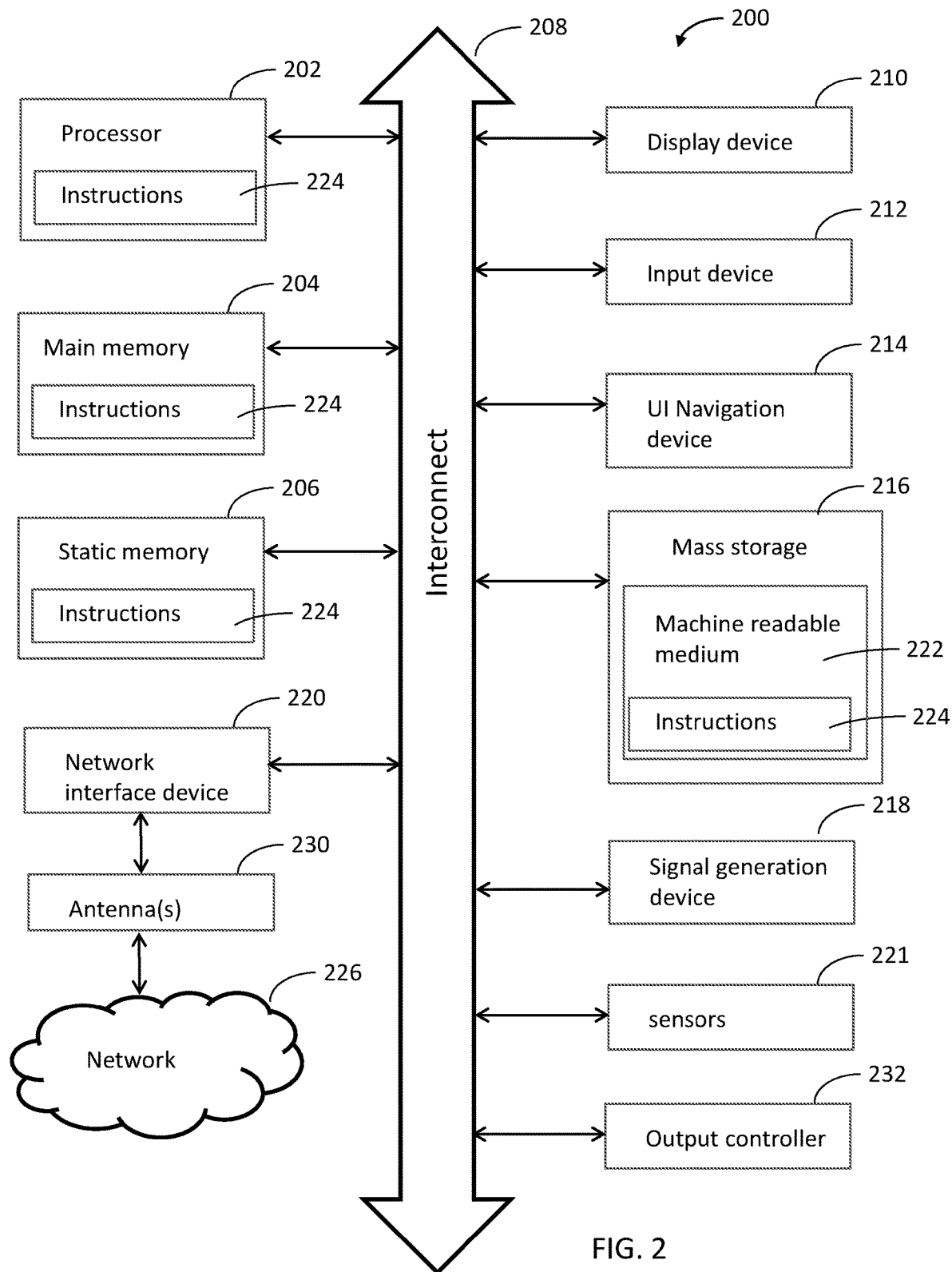
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
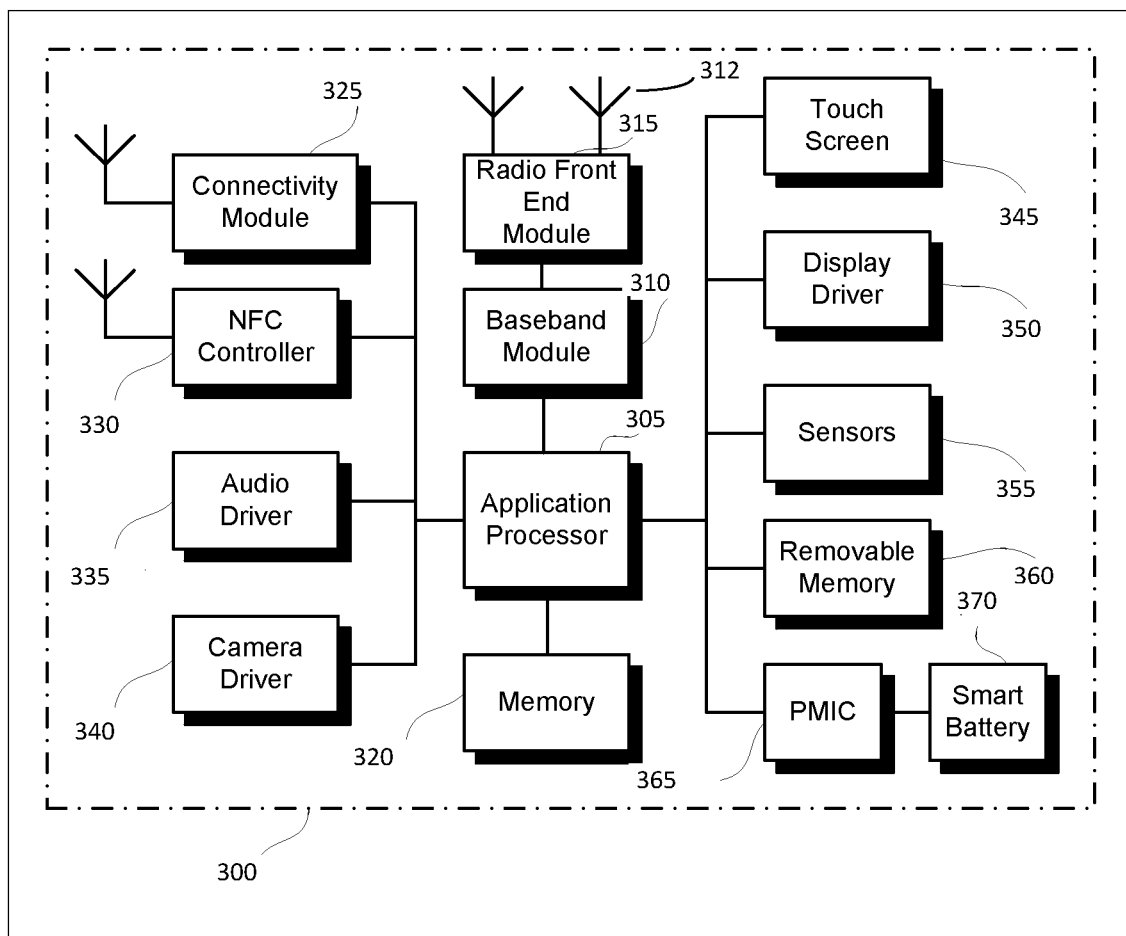
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (VC) or universal programmable serial interface module, real time clock (RTC), timer-counters including interval and watchdog timers, general purpose input-output (10), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
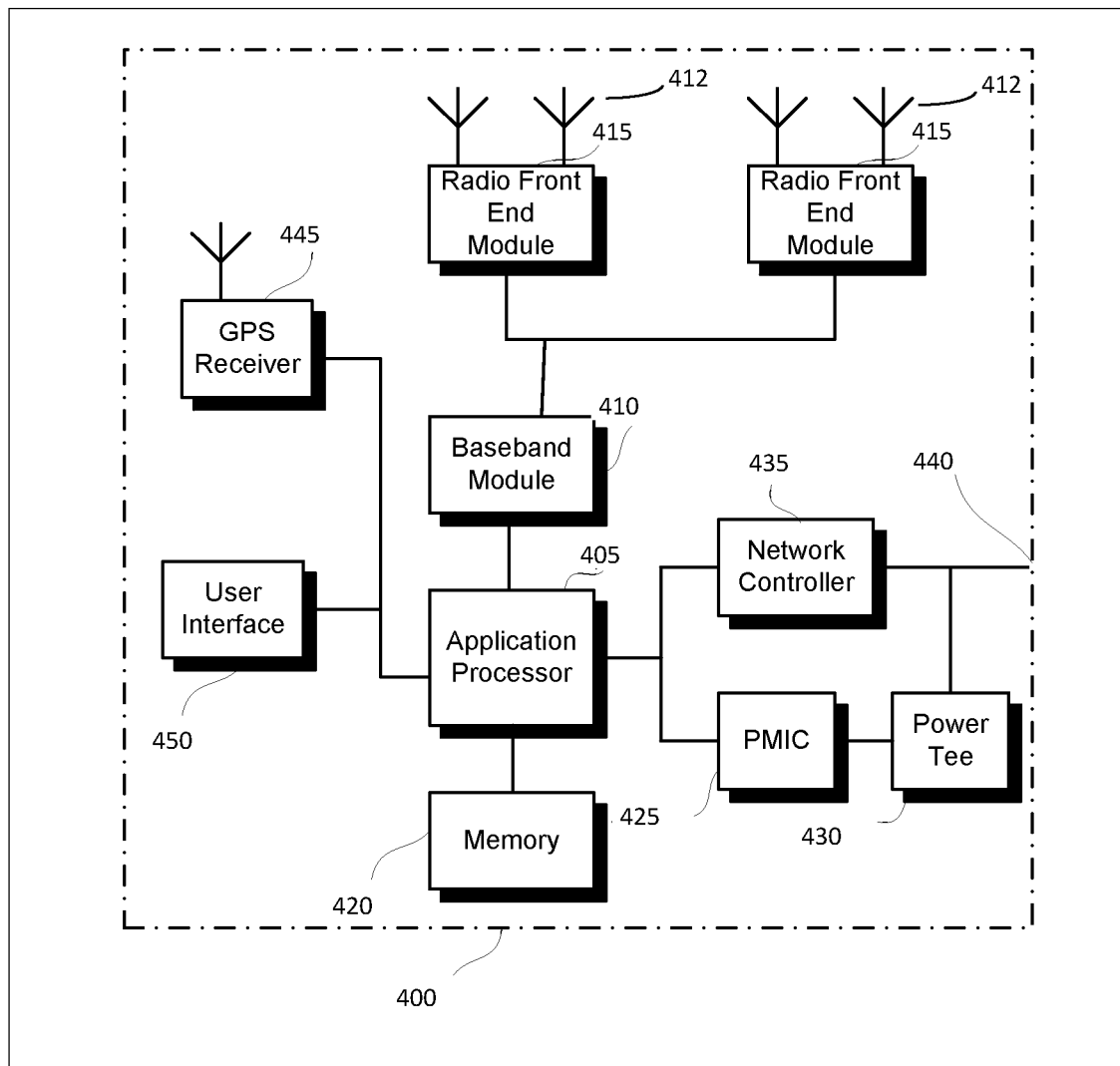
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with some aspects. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
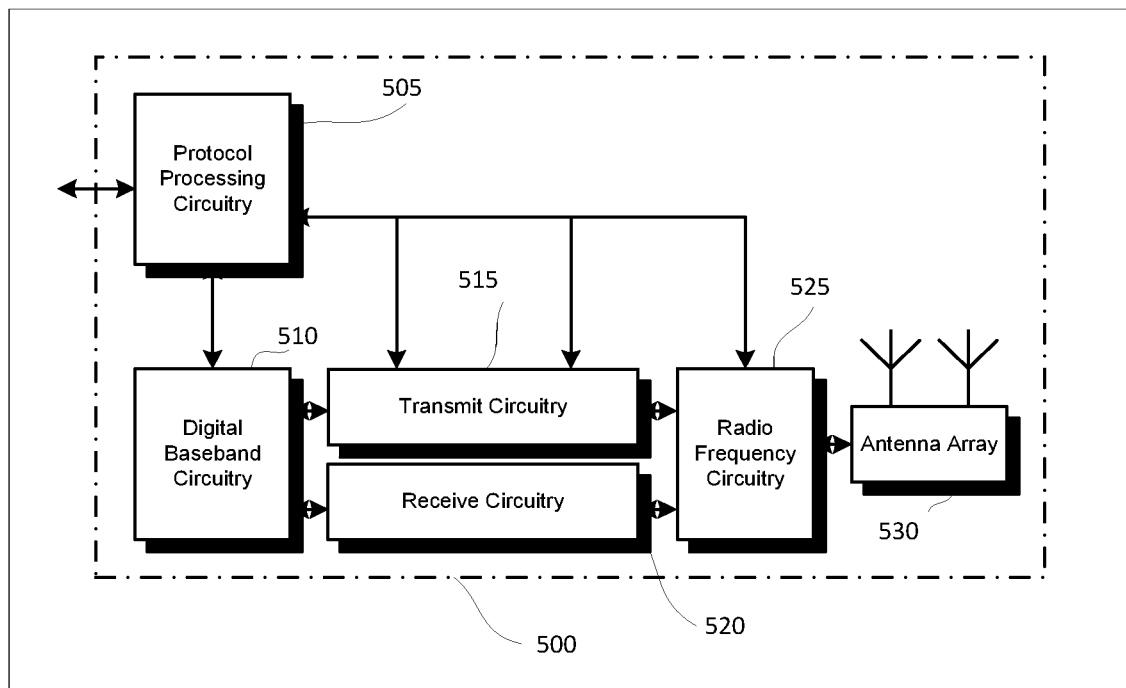
FIG. 5 illustrates an exemplary communication circuitry according to some aspects.

FIG. 5 illustrates an exemplary communication circuitry according to some aspects. Circuitry 500 is alternatively grouped according to functions. Components as shown in circuitry 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
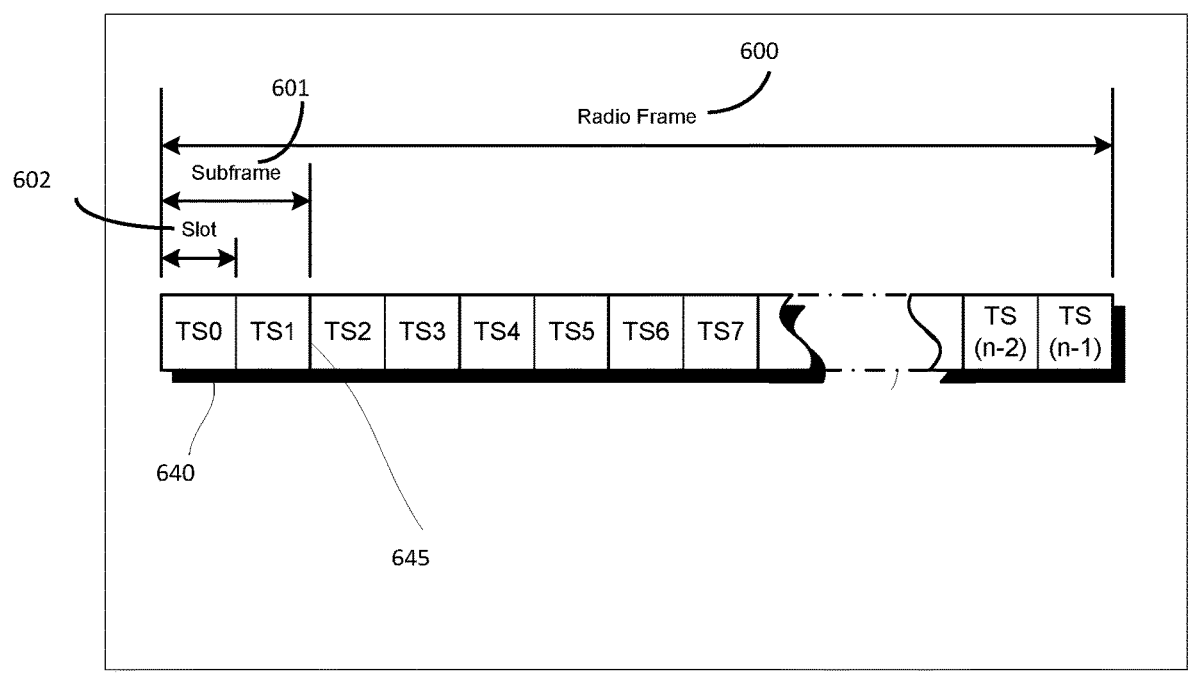
FIG. 6 illustrates an example of a radio frame structure in accordance with some embodiments.
Figures 7A, 7B:
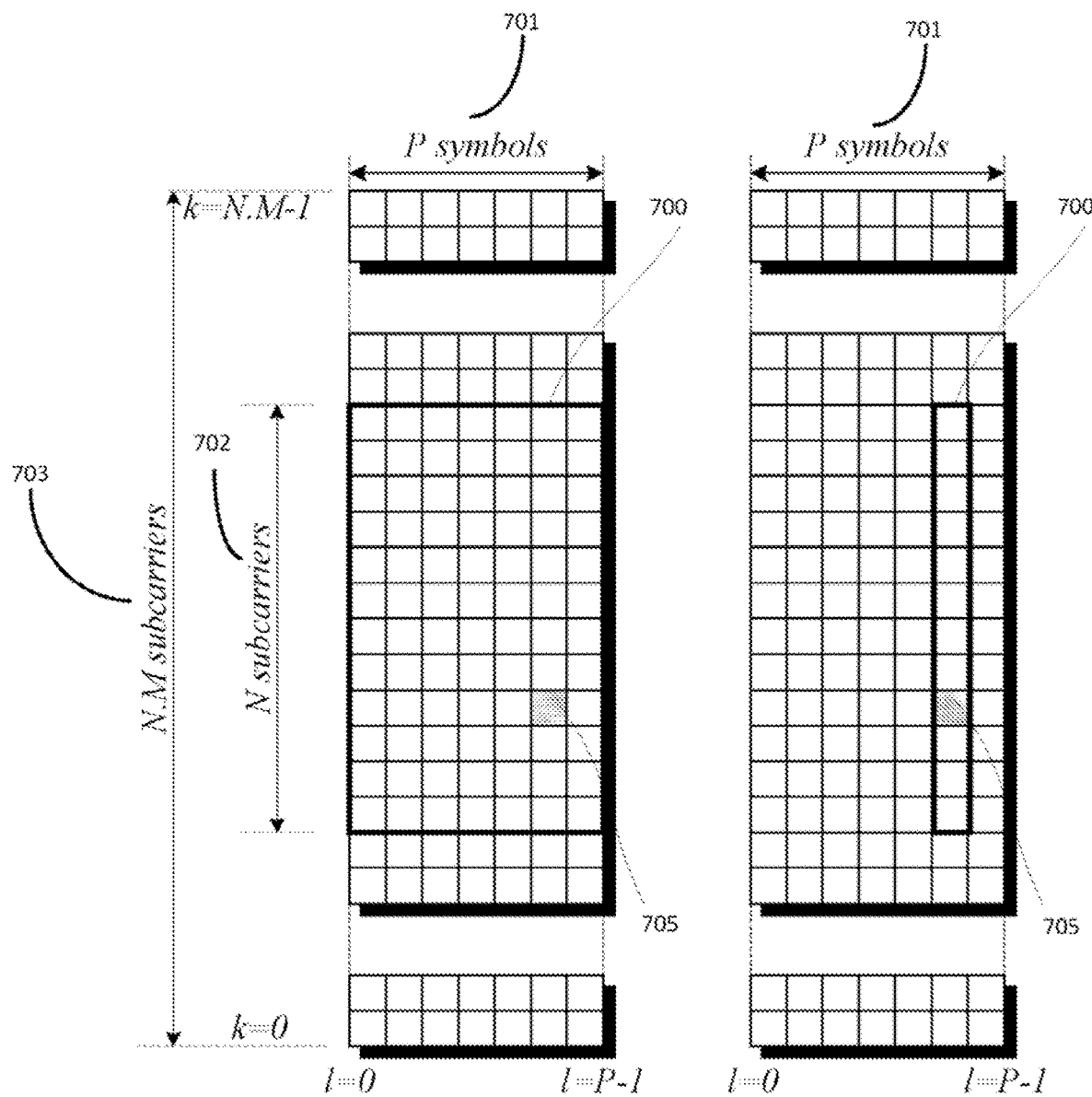
FIG. 7A and FIG. 7B illustrate example frequency resources in accordance with some embodiments.

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2*i* and 2*i*+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 601.

Referring to FIGS. 7A and 7B, in some aspects, a sub-component of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, 1) where k is the index number of subcarrier, in the range 0 to N·M−1 (as indicated by 703), where N is the number of subcarriers in a resource block, and M is the number of resource blocks spanning a component carrier in the frequency domain.

In accordance with some embodiments, the UE 102 may attempt to decode sidelink synchronization signals (SLSSs) received on component carriers (CCs) of a carrier aggregation. In one configuration of the carrier aggregation, synchronization resources for SLSS transmissions may be aligned across the CCs at subframe boundaries in time, restricted to a portion of the CCs, and restricted to a same sub-frame. The UE 102 may, for each of the CCs on which one or more SLSSs are decoded, determine a priority level for the CC based on indicators in the SLSSs received on the CC. The UE 102 may select, from the CCs on which one or more SLSSs are decoded, the CC for which the determined priority level is highest. The UE 102 may determine a reference timing for sidelink communication based on the one or more SLSSs received on the selected CC. These embodiments are described in more detail below.

Figure 8:
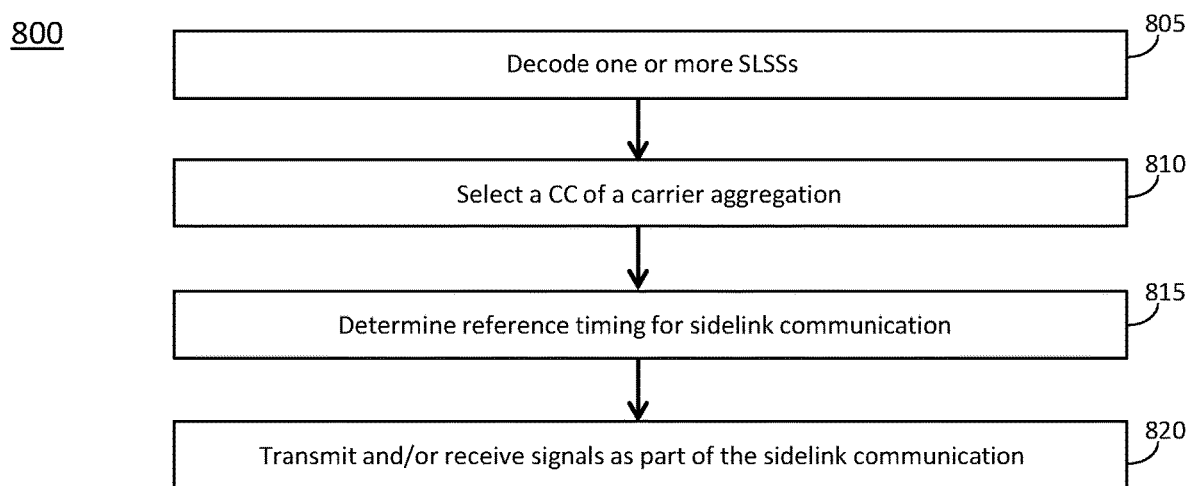
FIG. 8 illustrates the operation of a method of communication in accordance with some embodiments.
Figure 9:
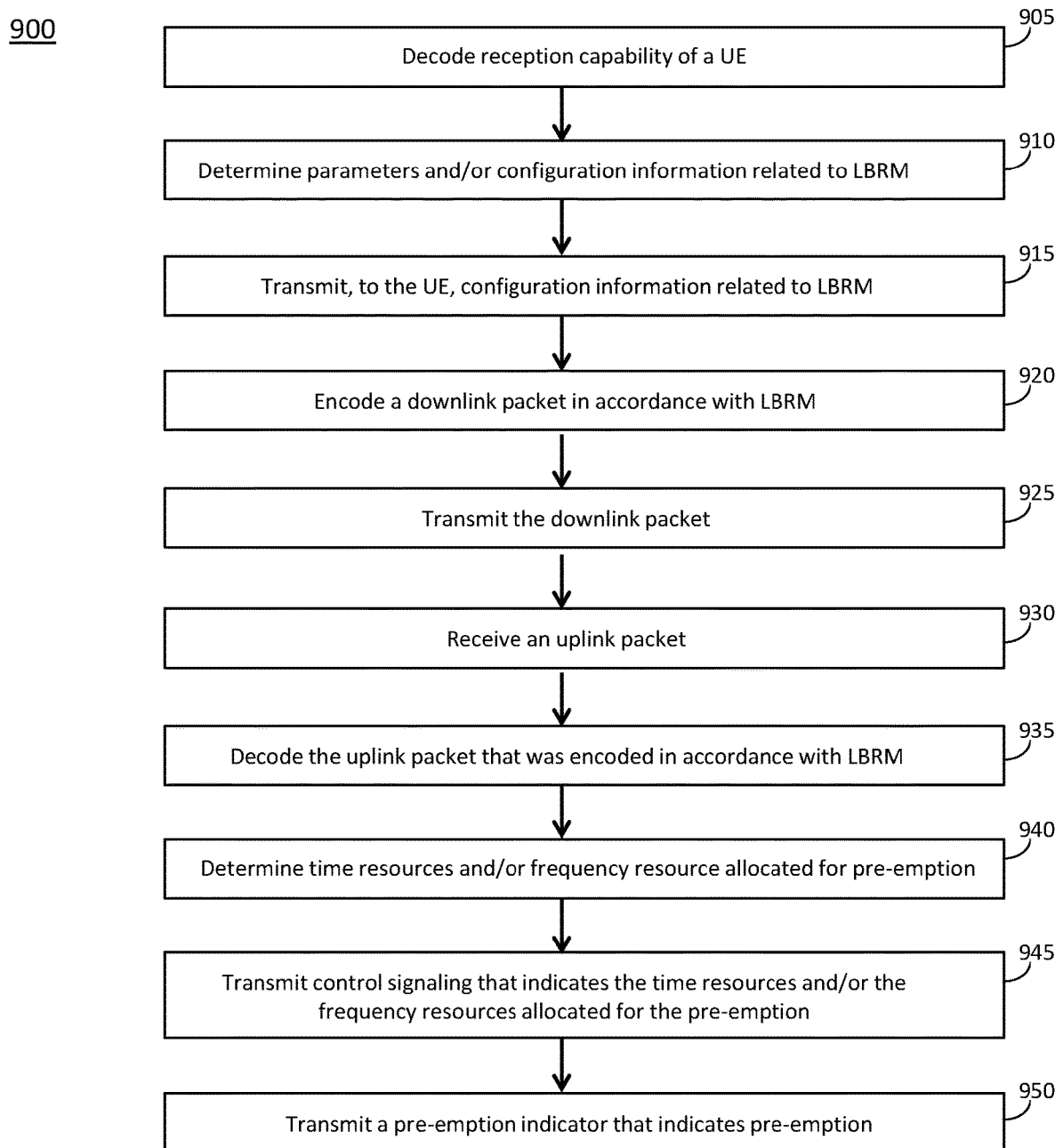
FIG. 9 illustrates the operation of another method of communication in accordance with some embodiments.

FIG. 8 illustrates the operation of a method of communication in accordance with some embodiments. FIG. 9 illustrates the operation of another method of communication in accordance with some embodiments. It is important to note that embodiments of the methods 800, 900 may include additional or even fewer operations or processes in comparison to what is illustrated in FIGS. 8-9. In addition, embodiments of the methods 800, 900 are not necessarily limited to the chronological order that is shown in FIGS. 8-9. In describing the methods 800, 900, reference may be made to one or more figures, although it is understood that the methods 800, 900 may be practiced with any other suitable systems, interfaces and components.

In some embodiments, a UE 102 may perform one or more operations of the method 800, but embodiments are not limited to performance of the method 800 and/or operations of it by the UE 102. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In a non-limiting example, the gNB 105 may perform an operation that may be the same as, similar to, reciprocal to and/or related to an operation of the method 800, in some embodiments.

In some embodiments, a gNB 105 may perform one or more operations of the method 900, but embodiments are not limited to performance of the method 900 and/or operations of it by the gNB 105. In some embodiments, another device and/or component may perform one or more operations of the method 900. In some embodiments, another device and/or component may perform one or more operations that may be similar to one or more operations of the method 900. In some embodiments, another device and/or component may perform one or more operations that may be reciprocal to one or more operations of the method 900. In a non-limiting example, the UE 102 may perform an operation that may be the same as, similar to, reciprocal to and/or related to an operation of the method 800, in some embodiments.

It should be noted that one or more operations of one of the methods 800, 900 may be the same as, similar to and/or reciprocal to one or more operations of the other method. For instance, an operation of the method 800 may be the same as, similar to and/or reciprocal to an operation of the method 900, in some embodiments. In a non-limiting example, an operation of the method 800 may include reception of an element (such as a frame, block, message and/or other) by the UE 102, and an operation of the method 900 may include transmission of a same element (and/or similar element) by the gNB 105. In some cases, descriptions of operations and techniques described as part of one of the methods 800, 900 may be relevant to the other method.

Discussion of various techniques and concepts regarding one of the methods 800, 900 and/or other method may be applicable to one of the other methods, although the scope of embodiments is not limited in this respect.

The methods 800, 900 and other methods described herein may refer to eNBs 104, gNBs 105 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the methods 800, 900 and other methods described herein may be practiced by wireless devices configured to operate in other suitable types of wireless communication systems, including systems configured to operate according to various IEEE standards such as IEEE 802.11. The methods 800, 900 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of elements that are included in standards, however.

At operation 805, the UE 102 may decode one or more sidelink synchronization signals (SLSSs). At operation 810, the UE 102 may select a CC of a carrier aggregation. At operation 815, the UE 102 may determine reference timing for sidelink communication. At operation 820, the UE 102 may transmit and/or receive signals as part of the sidelink communication.

In some embodiments, an apparatus of a UE 102 may comprise memory. The memory may be configurable to store information related to the decoded SLSSs. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to decoding the SLSSs. The apparatus may include a transceiver to receive the SLSSs. The transceiver may transmit and/or receive other blocks, messages and/or other elements.

At operation 905, the gNB 105 may decode information related to reception capability of a UE 102. At operation 910, the gNB 105 may determine parameters and/or configuration information related to limited buffer rate-matching (LBRM). At operation 915, the gNB 105 may transmit, to the UE 102, information related to the determined parameters and/or the configuration information. At operation 920, the gNB 105 may encode a downlink packet in accordance with LBRM. At operation 925, the gNB 105 may transmit the downlink packet. At operation 930, the gNB 105 may receive an uplink packet. At operation 935, the gNB 105 may decode the uplink packet in accordance with LBRM.

At operation 940, the gNB 105 may determine time resources and/or frequency resource allocated for pre-emption. At operation 945, the gNB 105 may transmit control signaling that indicates the time resources and/or the frequency resources allocated for the pre-emption. At operation 950, the gNB 105 may transmit a pre-emption indicator that indicates pre-emption.

In some embodiments, the gNB 105 may perform one or more of operations 905-950. However, the gNB 105 may not necessarily perform all of operations 905-950, in some embodiments. In some embodiments, the gNB 105 may perform one or more of operations 905-935, but may not necessarily perform operations 940-950. For instance, the gNB 105 may perform one or more operations related to LBRM, but may not necessarily perform operations related to pre-emption, in some embodiments. In some embodiments, the gNB 105 may perform one or more of operations 940-950, but may not necessarily perform operations 905-935. For instance, the gNB 105 may perform one or more operations related to pre-emption, but may not necessarily perform operations related to LBRM, in some embodiments.

In some embodiments, an apparatus of a gNB 105 may comprise memory. The memory may be configurable to store information related to LBRM. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to encoding of downlink packets and/or decoding of uplink packets. The apparatus may include a transceiver to transmit downlink packets and/or receive uplink packets. The transceiver may transmit and/or receive other blocks, messages and/or other element.

Figure 10:
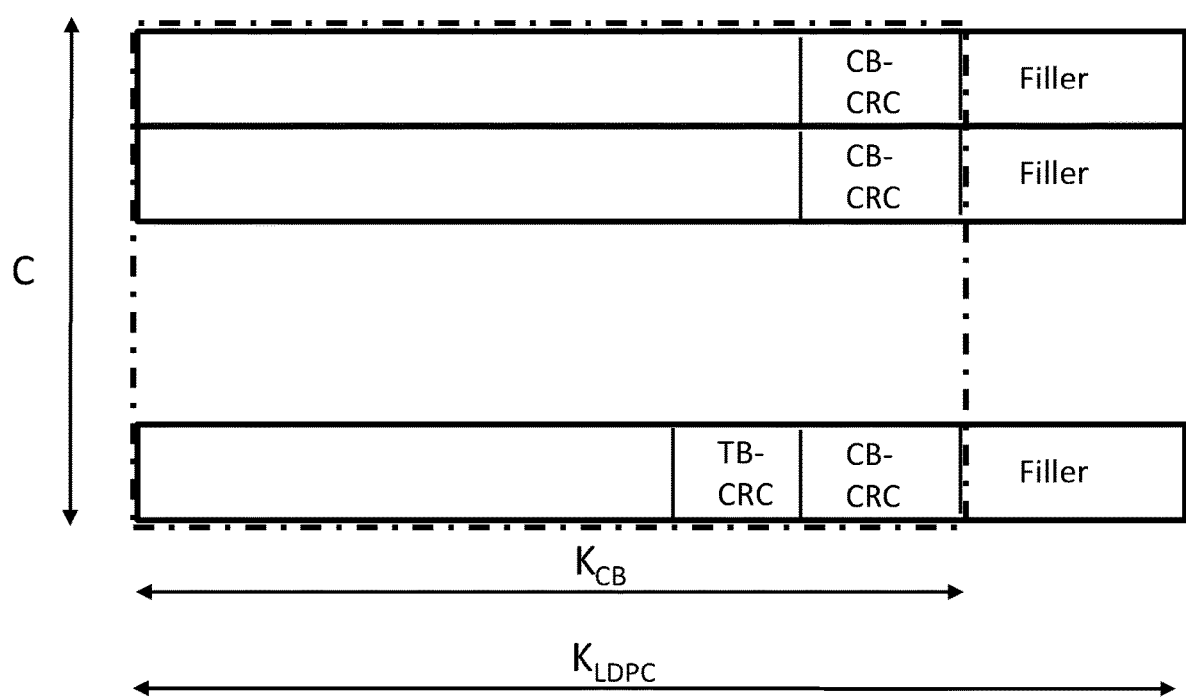
FIG. 10 illustrates example frame arrangements in accordance with some embodiments.
Figure 11:
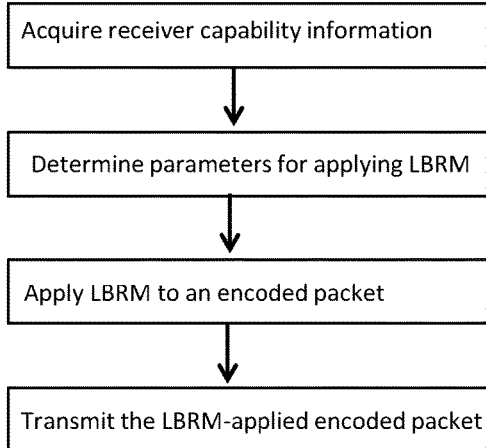
FIG. 11 illustrates example operations in accordance with some embodiments.
Figure 11:
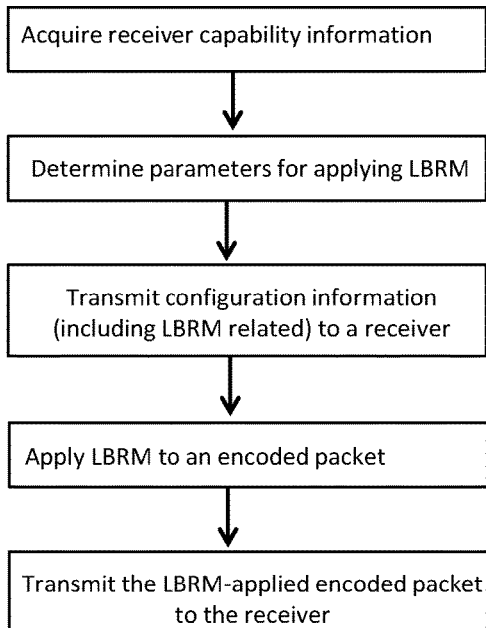
Figure 11:
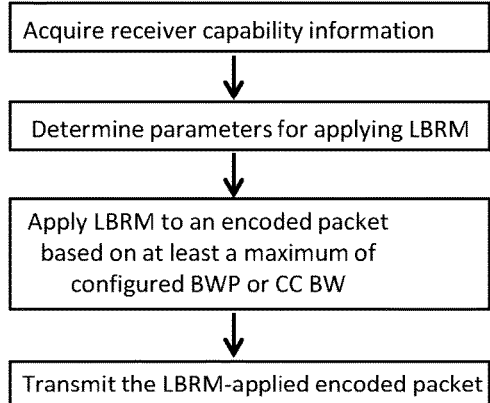
Figure 11:
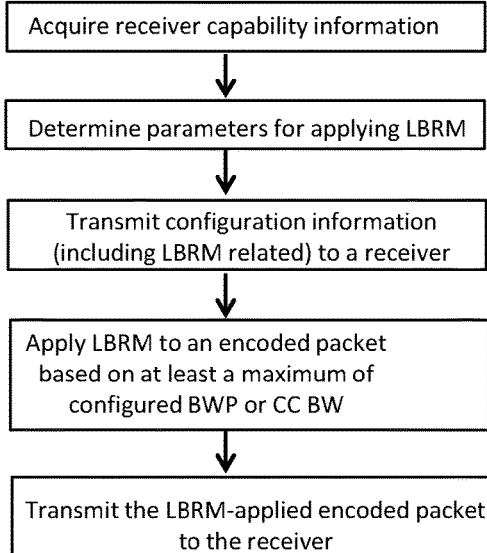
Figure 12:
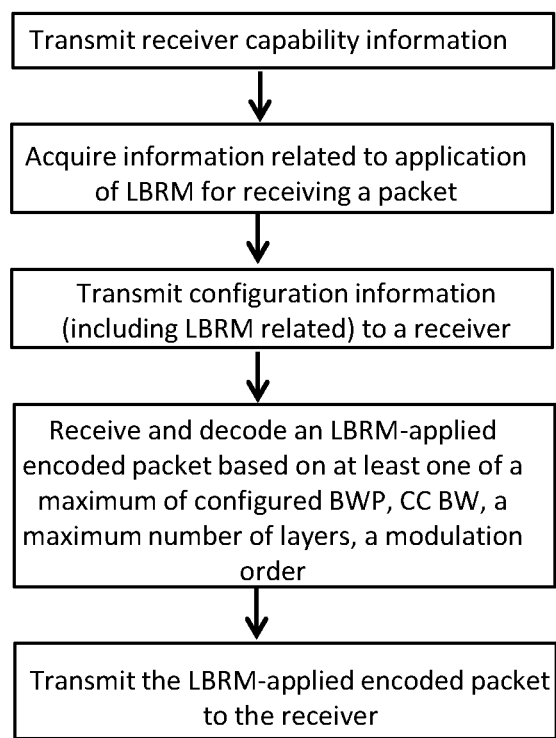
FIG. 12 illustrates example operations in accordance with some embodiments.
Figure 13:
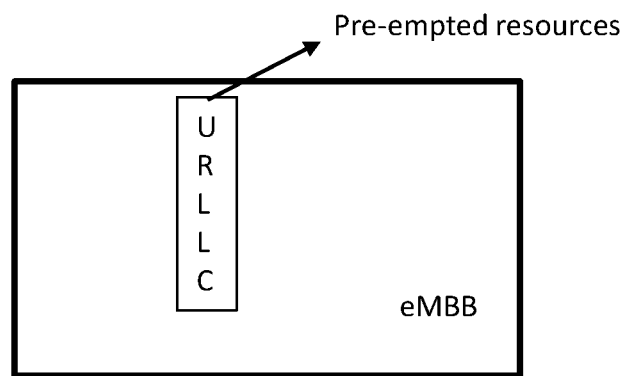
FIG. 13 illustrates an example arrangement of resources in accordance with some embodiments.
Figure 14:
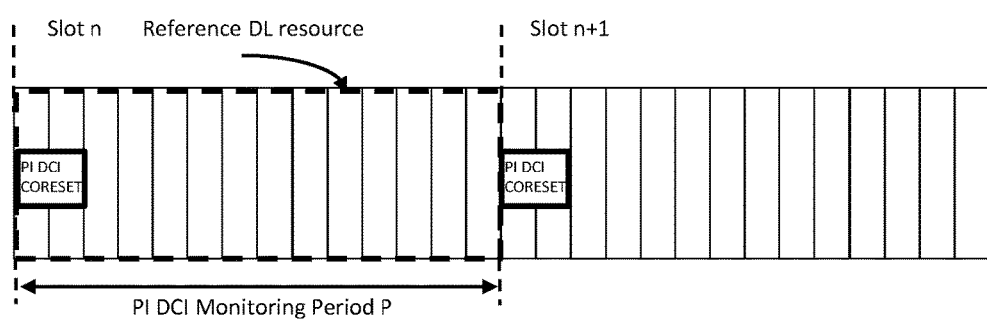
FIG. 14 illustrates example arrangements of slots in accordance with some embodiments.
Figure 14:
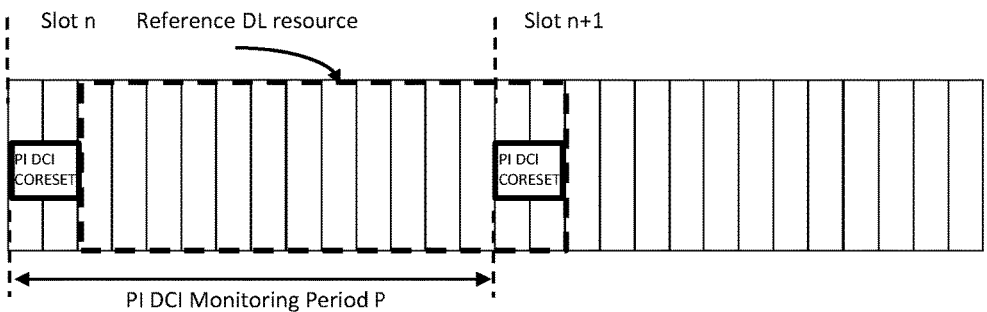
Figure 15:
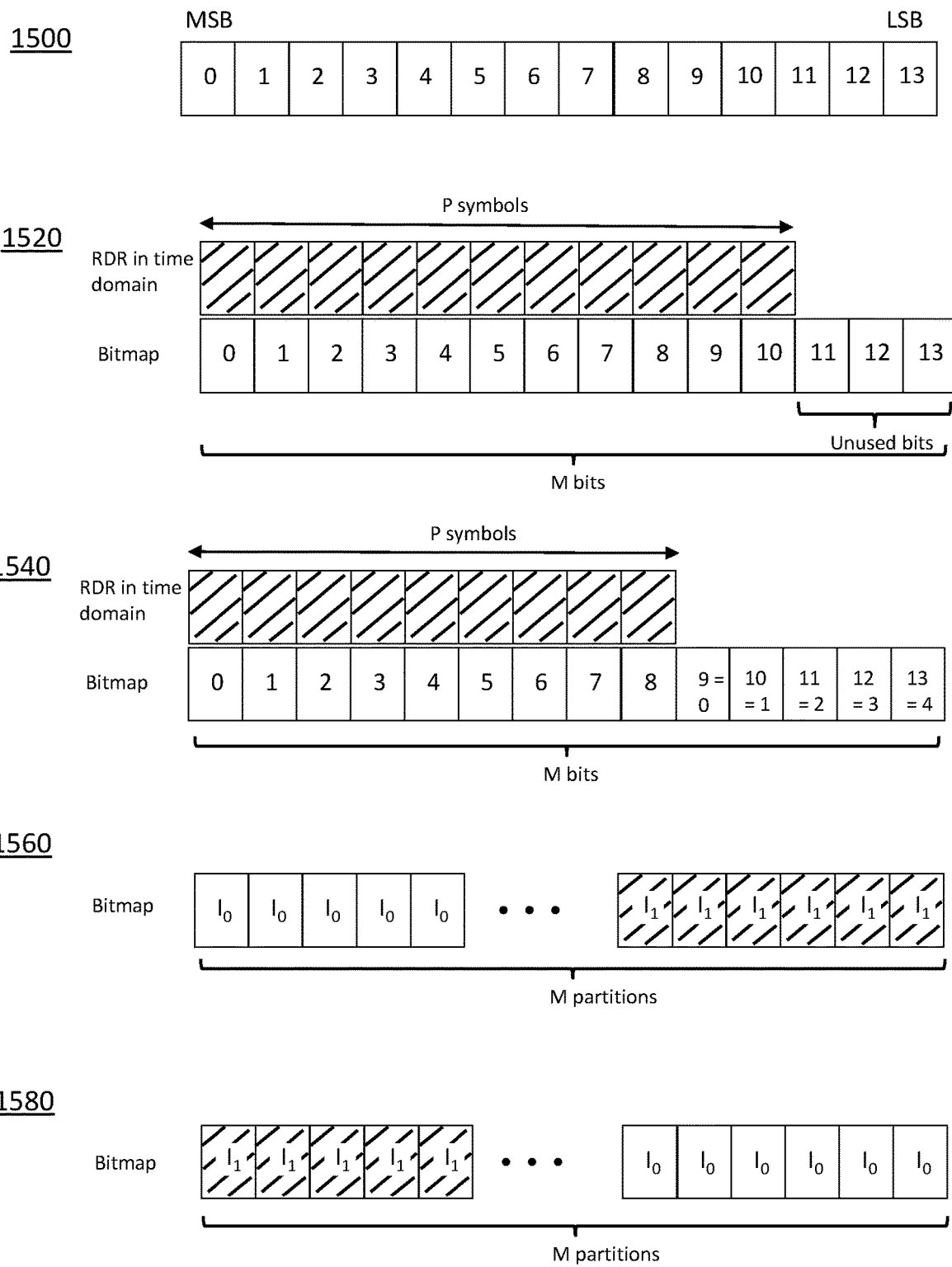
FIG. 15 illustrates example arrangements of symbols, bits, and partitions in accordance with some embodiments.
Figure 16:
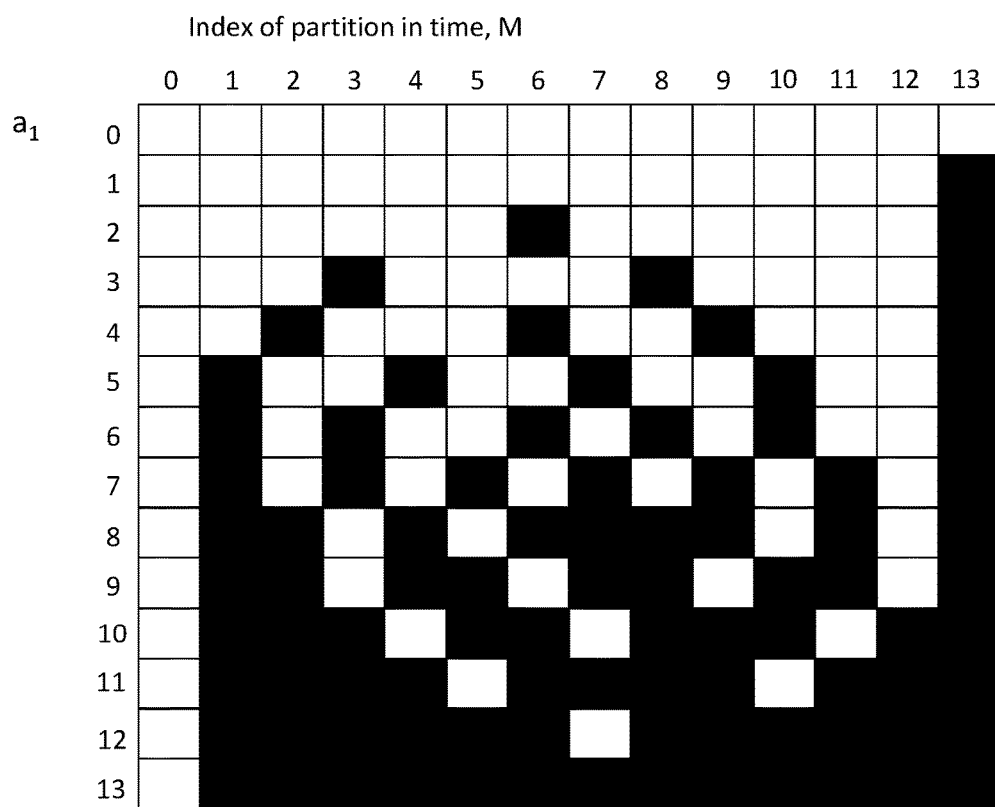
FIG. 16 illustrates example arrangements of partitions in accordance with some embodiments.
Figure 16:
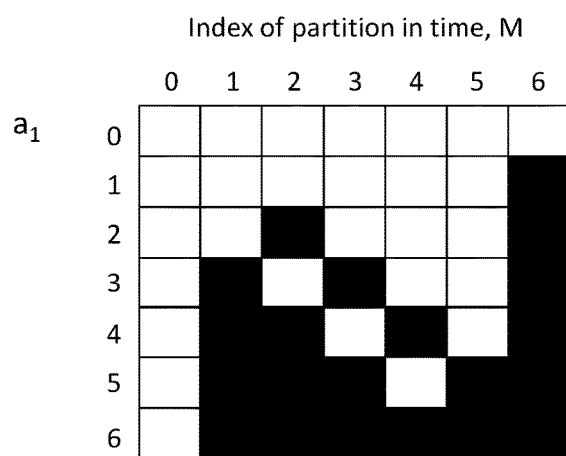
Figure 17:
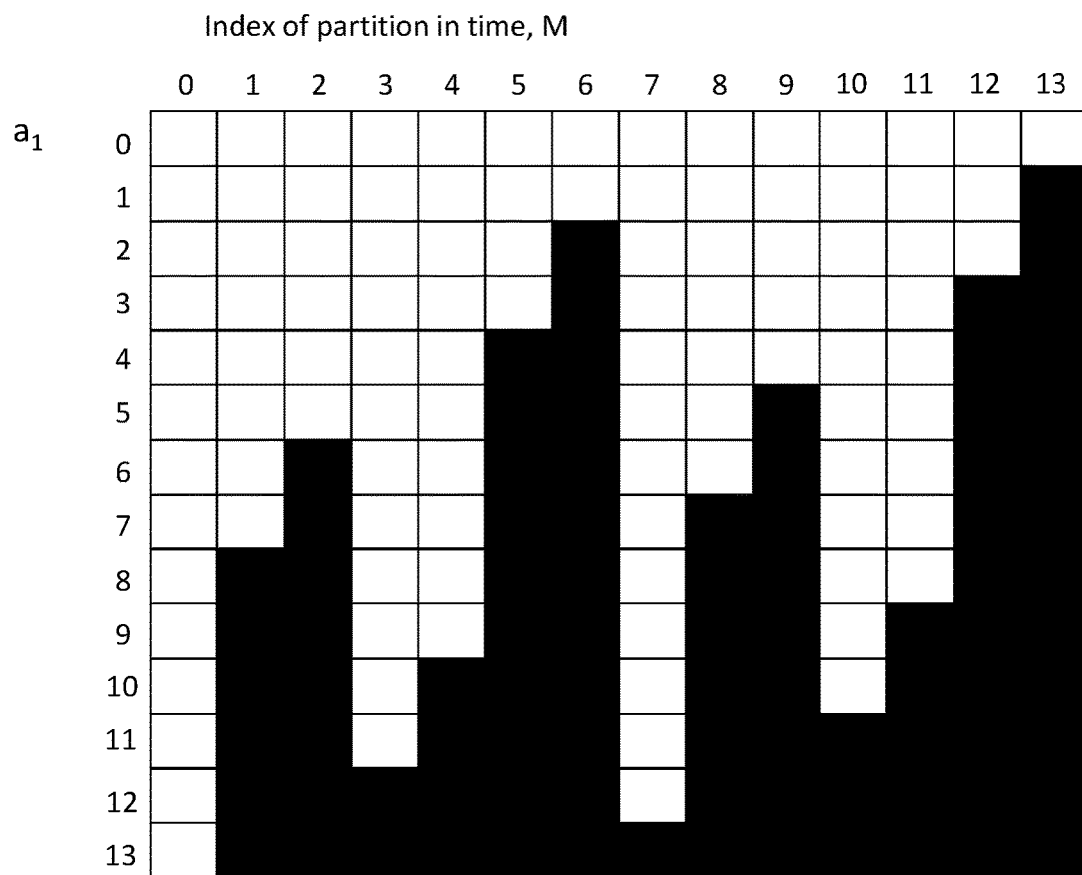
FIG. 17 illustrates example arrangements of partitions in accordance with some embodiments.
Figure 17:
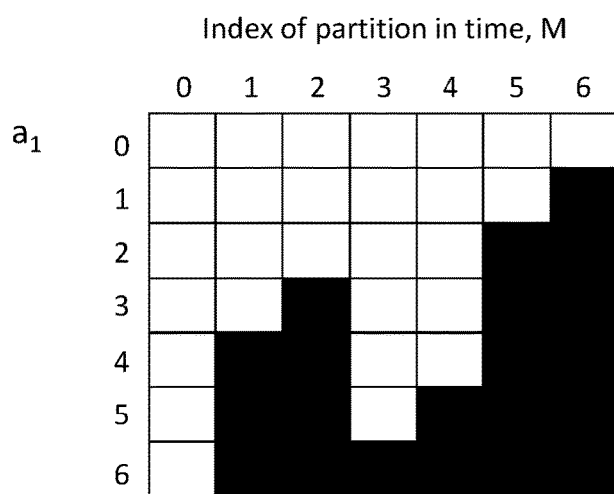
Figure 18:
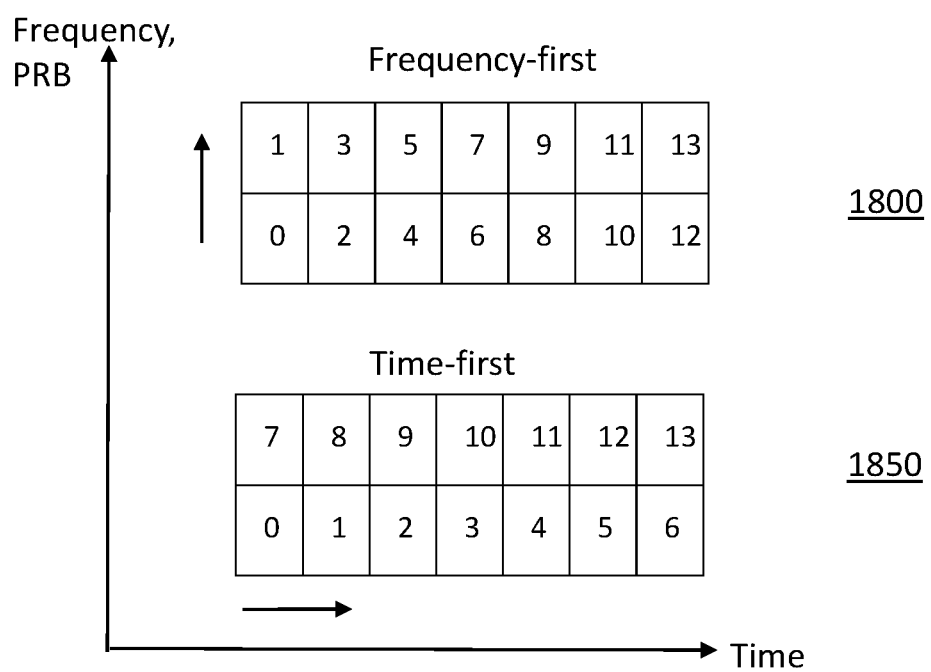
FIG. 18 illustrates example arrangements of time resources and frequency resources in accordance with some embodiments.
Figure 19:
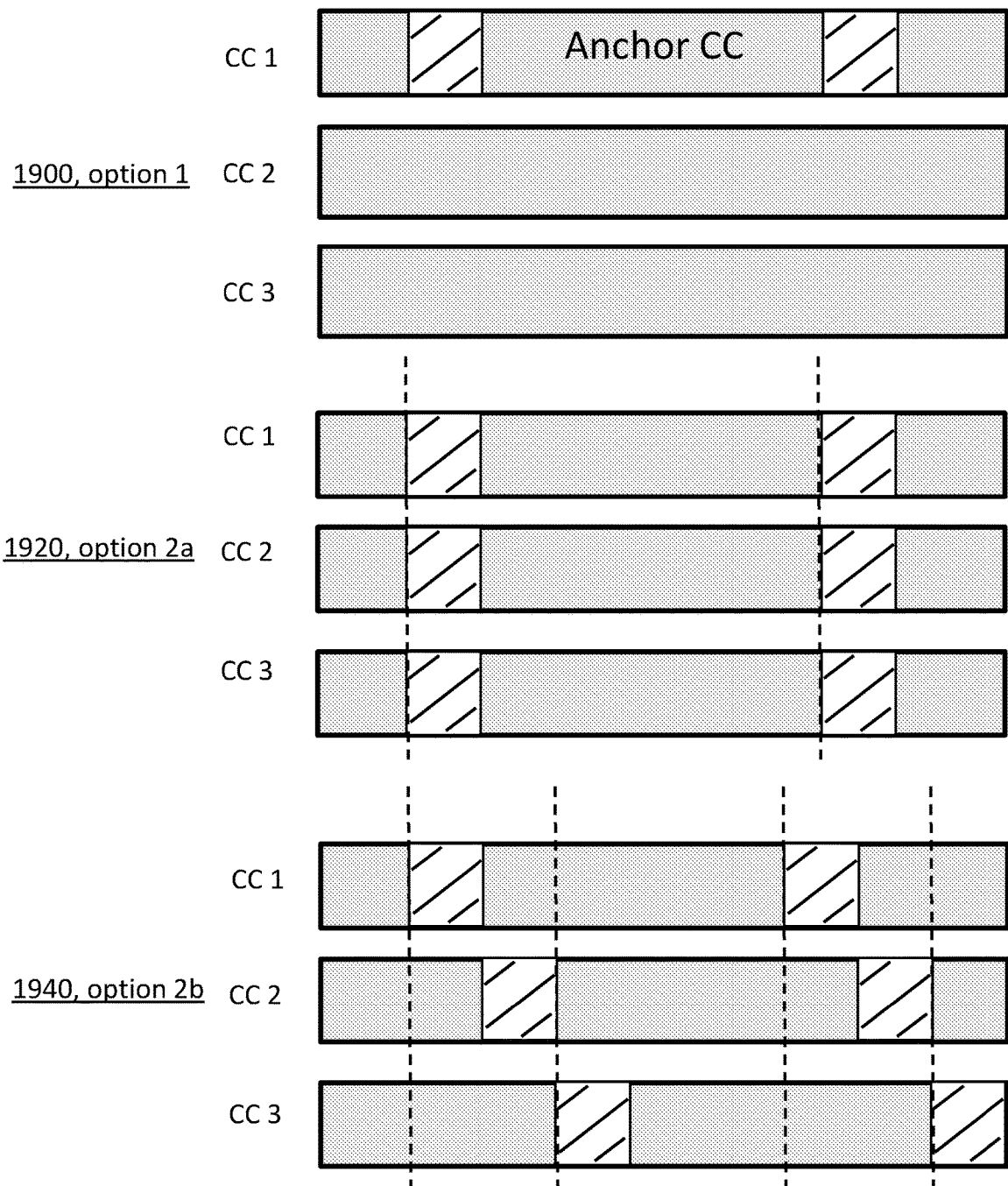
FIG. 19 illustrates examples of carrier aggregation in accordance with some embodiments.
Figure 20:
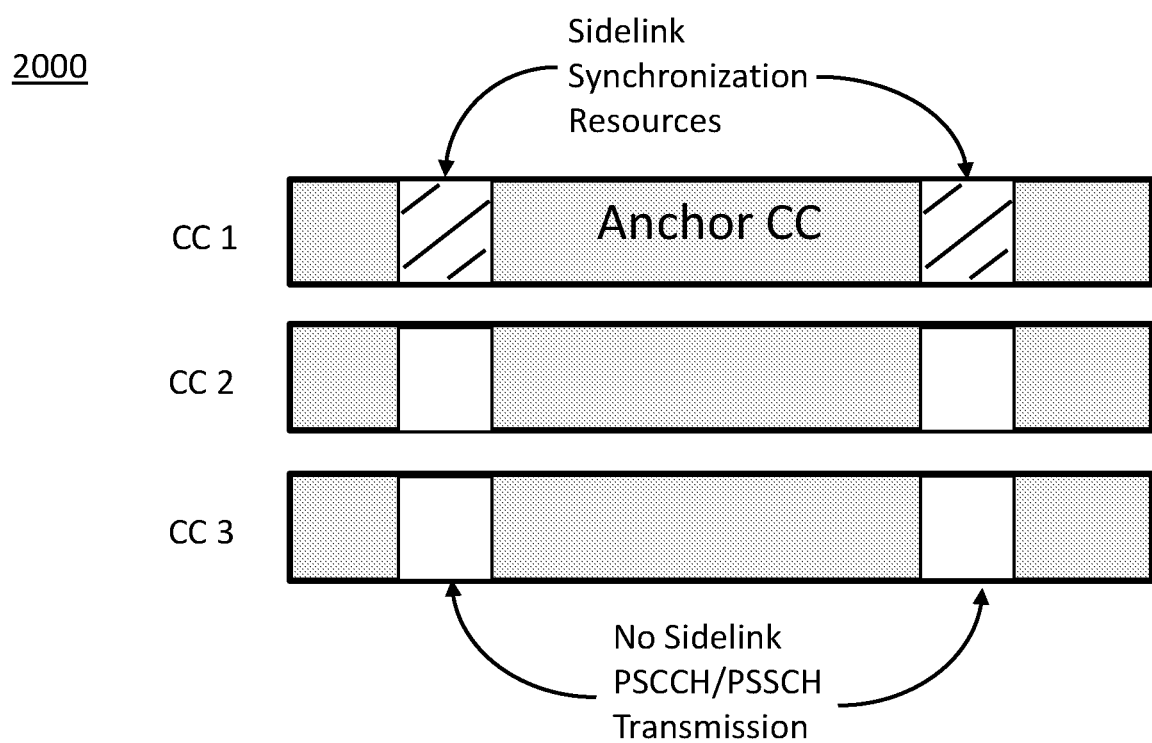
FIG. 20 illustrates an example of carrier aggregation in accordance with some embodiments.
Figure 21A:
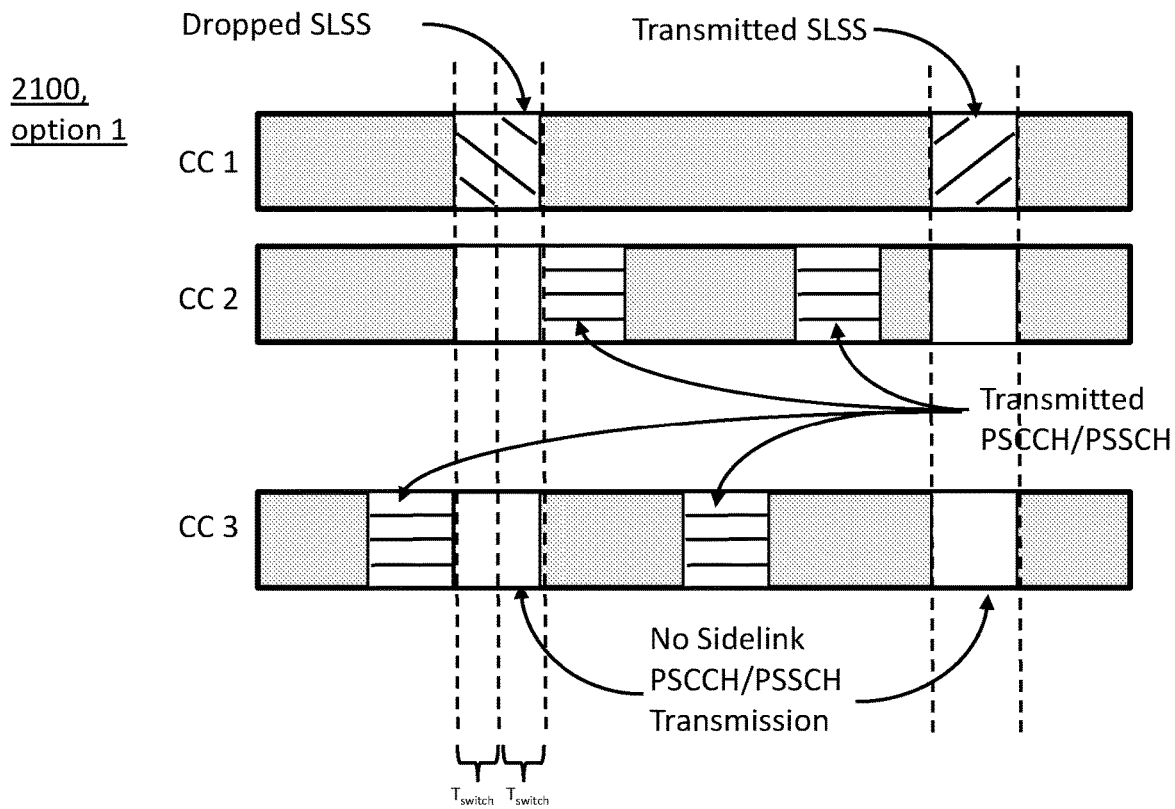
FIG. 21A and FIG. 21B illustrate examples of carrier aggregation in accordance with some embodiments.

FIG. 10 illustrates example frame arrangements in accordance with some embodiments. FIG. 11 illustrates example operations in accordance with some embodiments. FIG. 12 illustrates example operations in accordance with some embodiments. FIG. 13 illustrates an example arrangement of resources in accordance with some embodiments. FIG. 14 illustrates example arrangements of slots in accordance with some embodiments. FIG. 15 illustrates example arrangements of symbols, bits, and partitions in accordance with some embodiments. FIG. 16 illustrates example arrangements of partitions in accordance with some embodiments. FIG. 17 illustrates example arrangements of partitions in accordance with some embodiments. FIG. 18 illustrates example arrangements of time resources and frequency resources in accordance with some embodiments. FIG. 19 illustrates examples of carrier aggregation in accordance with some embodiments. FIG. 20 illustrates an example of carrier aggregation in accordance with some embodiments. FIG. 21A and FIG. 21B illustrate examples of carrier aggregation in accordance with some embodiments. In references herein, "FIG. 21" may include FIG. 21A, and FIG. 21B.

It should be noted that the examples shown in FIGS. 10-21 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 10-21. Although some of the elements shown in the examples of FIGS. 10-21 may be included in a 3GPP LTE standard, 5G standard, NR standard and/or other standard, embodiments are not limited to usage of such elements that are included in standards.

In some embodiments, a limited buffer rate-matching may include a reference transport block size determined based on maximum configured bandwidth part for reception at the device. In some cases, usage of this technique may enable an efficient application of LBRM. In some cases, the usage of this technique may help to reduce decoding latency/complexity on the device and network side.

In some embodiments, limited buffer rate-matching may be supported for LDPC in NR. In particular, the LDPC matrix design, including the base graph structure, may take into account the decoding latency savings by enabling base matrix design composed of single-parity-check based extension for support of lower code rates. This structure may enable an LDPC decoder to operate on a smaller base graph at higher code rates, thereby reducing latency, which may be important for cases such as peak throughput where typically the UE 102 is operating at relatively high MCS at initial transmissions.

In some embodiments, a network may schedule data using control information that can include resource allocation (for instance, time/frequency resources and number of spatial layers), modulation and coding scheme (for instance, in terms of a rate and modulation order), pilot information (such as DMRS overhead and/or other) and/or other. The transport block size may be determined based on at least the information such as resource allocation and MCS, and any other information (for instance, using a formula followed by an adjustment).

In a non-limiting example, the following formula and/or similar formula may be used: $TBS_{est} = Q_m \times R \times N_{RE} \times N_L$. In the above, $Q_m$ denotes the scheduled modulation order, R denotes the intended rate, and $N_{RE}$ denotes the number of resource elements in the resource allocation on which data can be transmitted. In some cases, $R \times Q_m$ may denote the spectral efficiency, and $N_{RE}$ may be determined from allocated resources with some adjustments (including e.g. quantization) to account for the overhead and quantization, and $N_L$ may denote a number of layers to which the TBS is mapped.

In some embodiments, a nominal data allocation may be a rectangular grid of time-frequency resources (# of OFDM symbols×number of subcarriers). In some embodiments, overheads that may be taken into account can include the following: DMRS, SRS, guard periods or symbols indicated as "Unknown" via slot format information (SFI), possible PDCCH, SSS, PSS, PBCH, CSI-RS, and any other overhead explicitly indicated to the UE 102. In some embodiments, a DMRS density may be variable depending upon the possible configuration (such as front-loaded vs front/back DMRS, different number of antenna ports, presence/absence of TRS, and/or other). In some embodiments, some overhead such as DMRS may be accounted for while determining the number of REs ($N_{RE}$). In some embodiments, overhead due to other signals may be accounted for using a semi-static overhead value.

In some embodiments, the $N_{RE}$ may be determined using Z*# scheduled PRBs, where Z may be given by 12*number of scheduled OFDM symbols—number of REs for DMRS— number of REs for overhead. In some embodiments, a number of REs for overhead may have one value for UL, and one value for DL, and may be determined semi-statically.

In some embodiments, the $TBS_{est}$ may be further adjusted to obtain a transport block by taking into account the LDPC code block segmentation, and any special rules such as supporting equal code block sizes, as well as taking into account the corresponding LDPC base graph dimension, etc. In some embodiments, for cases in which there are more than one code block (C>1), CRCs may be attached at both transport block and code block level. A non-limiting example 1000 is shown in FIG. 10.

In some embodiments, NR can support carrier aggregation, wherein component carrier bandwidths can be as large as 100 MHz (for below −6 GHz carrier frequency) or even 400 MHz (for mmWave), supporting flexible subcarrier spacing (15 kHz*$2^n$), and up to 4 k FFT size. Embodiments are not limited to the bandwidth sizes given above and elsewhere herein, as any suitable values may be used. Furthermore, for various use cases (such as UE power savings, bandwidth confinement for flexible spectrum usage/coexistence, and/or other) the concept of bandwidth parts may also be supported. In some embodiments, the UE 102 may be configured with one or more bandwidth parts (BWPs) within a given component carrier. For example, a UE 102 may be configured with up to four BWPs, and each BWP can correspond to a set of contiguous resource blocks (or a frequency range), which may be indicated to the UE 102 for example, by a bitmap corresponding to resource blocks in frequency domain. In some embodiments, a resource block can correspond to 12 subcarriers in frequency domain×1 OFDM symbol in time domain.

In a non-limiting example, if the resource blocks corresponding to a carrier are labelled as RB0, RB1, . . . RB274, the following may be used: BWP1=[RB10-RB15], (6 RBs); BWP2=[RB0-RB99], (100 RBs); BWP3=[RB0-RB274], (275 RBs); BWP4=[RB0-RB49], (50 RBs). Embodiments are not limited to the BWP values given above and elsewhere herein, as any suitable values may be used.

In some embodiments, the BWP3 can correspond to the bandwidth corresponding to a component carrier, whereas some BWPs can correspond to a bandwidth smaller than a component carrier. In some embodiments, the network can configure all BWPs to be smaller than the component carrier (even if UE 102 can support reception on the bandwidth corresponding to the entire component carrier).

In some embodiments, the network can indicate an active BWP for the UE 102 and the UE 102 can receive and/or transmit based on the corresponding active BWP resources. For example, if the network indicates an active BWP for downlink reception, the UE 102 may receive downlink data and control in the active BWP, and if the network activates another BWP for downlink reception, the UE 102 may switch (for example, subject to switching constraints such as retuning time, etc) to the activated BWP for downlink reception. In some embodiments, a default BWP may also be possible. For example, the default BWP may be indicated via the broadcast information such as Master information block, remaining system information, or a control resource set (CORESET) or may be indicated via initial connection setup or explicit indication via RRC or MAC signalling. Other techniques may be used to indicate the default BWP, in some embodiments. In some embodiments, a timer based mechanism can be supported wherein a UE 102 may switch back to its default active BWP after a timer expires and various methods of setting up/updating the timer are feasible.

In some embodiments, for LDPC, decoding latency may depend on the number of edges in the base graph. Therefore, applying Limited Buffer Rate Matching can simultaneously reduce both UE buffer complexity, as well as the decoding latency at peak data rates. In some embodiments, lower rates may take more iterations to converge. In some cases, if the transmit rate-matching is limited to a higher rate than ⅓, it may also help the UE 102 with the decoding latency, or in other words it may allow the decoder throughput to be not optimized for the worst case always (i.e. max TBS decoded at lowest coding rate).

In some embodiments, for LBRM, a limitation on the buffer may be applied as part of the transmit buffer rate-matching. This may be done by applying a limitation for rate-matching on the circular buffer based on, for example, a reference minimum coding rate (⅔) for the largest transport block size schedulable for the UE 102 (based on maximum TBS determined either by reference configuration in spec or by using band/band combination signalling from the gNB 105 based on UE 102 capability). A non-limiting example to determine the maximum TBS follows. For an SCS of 30 kHz, BW of 100 MHz, 1 symbol for control, 1 symbol for DMRS, and single CW with 4-layers, and 96% BW occupancy, max $Q_m$=8, and max R=$^{94}\!/_{100}$, the maximum TBS~ (8×$^{94}\!/_{100}$)×(12×0.96×3300)×4=1,143,520~135 code blocks with BG1 (max CBS of 8448). Embodiments are not limited to the values given above or to the formula used. Other suitable values and/or similar formulas may be used, in some embodiments.

In some embodiments, a largest transport block schedulable for the UE 102 may be determined from reference configuration in the spec, or from the signaled peak data rate or calculated data rate from the UE 102 or indicated from the network, based on band combinations and/or baseband capabilities.

In some embodiments, LBRM can be applied for the downlink and/or uplink and/or sidelink and/or potential future applications on the sidelink and/or other. In some embodiments, LBRM can be handled by limiting the circular buffer size corresponding to code blocks that belong to a large transport block.

The following descriptions may refer to the downlink, but the scope of embodiments is not limited in this respect. Some or all of the techniques, operations and/or methods described below may be applicable to uplink operation, in some embodiments.

In some embodiments, for a given component carrier, the reference transport block size for LBRM ($TBS_{LBRM}$) can be determined based on at least one or more of the following: a reference resource allocation in the frequency domain for the UE 102 (such as a maximum number of resource blocks in the frequency domain for the component carrier or for the active or configured BWP for the component carrier and/or other parameter/value); a reference resource allocation in the time domain for the UE 102 (such as a maximum number of OFDM symbols and/or other parameter/value); a reference number of spatial layers for the UE 102 (such as a maximum number of spatial layers configured for the UE 102 for the component carrier and/or other parameter/value); a reference amount of reference signal overhead; a reference modulation order and/or coding rate (such as a maximum spectral efficiency schedulable and/or possible for the UE 102 for that component carrier and/or other parameter/value); and/or other.

In a non-limiting example, if a UE 102 is configured with one or more BWPs, the reference number of resource blocks may be determined from the BWP containing the largest number of resource blocks. In some embodiments, the reference $TBS_{LBRM}$ for a given component carrier can be derived based on the largest BWP configured for the UE 102.

In some embodiments, the reference number of resource blocks can be differently determined for DL and UL LBRM respectively. In some embodiments, LBRM may be used to minimize demands on decoder throughput and reduce decoder latency, and the reference number of resource blocks can be identified considering the dimensioning of the decoders at the UE 102 and gNB 105 for DL and UL respectively. Accordingly, for DL, the reference number of resource blocks can correspond to the largest BW supported by the UE 102 as indicated for the carrier or via band/band combination signaling. On the other hand, for UL, the reference number of resource blocks can correspond to the BW of the largest BWP with which the UE 102 is configured in the UL.

In some embodiments, based on UE capability, the network may be able to indicate parameters that are used to derive a reference $TBS_{LBRM}$ or explicitly indicate the $TBS_{LBRM}$. The $TBS_{LBRM}$ could be defined in terms of a formula such as the following (with some adjustment or quantization from $TBS_{est}$ to $TBS_{LBRM}$).

$$TBS_{est} = (Q_m \times R) \times N_{RE} \times N_L$$

In some embodiments, $Q_m$ can be a maximum modulation order configured for the UE 102 (such as $Q_m$=8 if 256-QAM is enabled; Qm=1024, if 1024 QAM is enabled; and/or other). In some embodiments, R can be a maximum code rate supported at the maximum modulation order (such as R=⅚, or $^{15}\!/_{16}$ or $^{31}\!/_{32}$, 0.935 or 0.95 and/or other value). In some embodiments, the value of $N_{RE}$ can be $N_{RB}$*Z, wherein $N_{RB}$ can be a component carrier bandwidth or maximum BWP (such as $N_{RB}$=275 or 100 and/or other value) with which the UE 102 is configured or a maximum BW supported by the UE 102 as indicated for the carrier or via band/band combination signaling. In some embodiments, the value of Z can be 14×12−1−1=144 REs (excluding 1 control, and 1 DMRS). In some embodiments, $N_L$ can be the maximum number of layers configured for the UE 102. For instance, $N_L$ can be 2 or 4 or 8, or it can be modulation dependent. For instance, $N_L$=4 if Qm=8 or $N_L$,=2 if Qm=10. Embodiments are not limited to the examples given above, to the values given above or to the formula given above. Other values, other formulas and/or similar formulas may be used, in some embodiments.

In some embodiments, based on UE capability, the network may indicate a set of reference parameters to determine the LBRM. The following are non-limiting examples of reference parameters: a transport block size $TBS_{LBRM}$; a number of code blocks ($C_{LBRM}$); a maximum code block size ($K_{CB-LBRM}$) (from which the reference transport block size may be calculated as $C_{LBRM}*K_{CB-LBRM}$; and/or other).

In some embodiments, LBRM may be applied, given a $TBS_{LBRM}$. In some embodiments, for a base graph BG of dimension $m_b \times n_b$ (corresponding to $k_b$ systematic part) with shift sizes given by a set of values, with a maximum code block size given by $maxCBS_{BG}$ bits, if the number of code blocks for a TBS of X is given by C and code block size given by K=kb×Z (lift or shift size is given by Z), then the total number of coded bits in the circular buffer per code block may be given by $K/R_{BG}$. In some embodiments, in NR, for base graph 1, $R_{BG}$ can be ⅓.

In some embodiments, given the LBRM rate of $R_{LBRM}$ and LBRM transport block size of $TBS_{LBRM}$, if the total number of coded bits in the LBRM-applied circular for TBS X is limited by $TBS_{LBRM}/R_{LBRM}$, and applying this limit to per code block, the LBRM per code block C can be given by min ($K/R_{BG}$, $TBS_{LBRM}/(R_{LBRM}*C)$). In case either input to the minimum function is not an integer, a floor, ceiling, rounding and/or other operation may be used to obtain an integer. In some embodiments, such operation(s) may be applied in techniques and/or methods described herein, although corresponding descriptions herein may not necessarily indicate usage of the operation.

In a non-limiting example given below, a floor operation is used. In some embodiments, all code blocks may have a same circular buffer value. In some embodiments, the following formula, a similar formula and/or other formula may be used.

$$CircBufferSize_{perCodeBlock} = \min\left(\frac{K}{R_{BG}}, \left\lfloor\frac{TBS_{LBRM}}{R_{LBRM} \cdot C}\right\rfloor\right)$$

In some embodiments, in the above, $TBS_{LBRM}$ may be replaced with $C_{LBRM}*K_{CB-LBRM}$ if the LBRM is applied based on the LBRM code blocks and code block size notation. In a non-limiting example, $R_{BG}$ is ⅓ for BG1, and ⅕ or lower for BG2 depending on the value for $k_b$ used for block size K. In some embodiments, the CircBufferSize may further be adjusted to align with the LDPC base graph shift size dimension Z. In a non-limiting example, the code block size K may be given by $k_b*Z$. In some embodiments, the following formula, a similar formula and/or other formula may be used.

$$CircBufferSize_{perCodeBlock} = Z \cdot \min\left(\frac{k_b}{R_{BG}}, \left\lfloor\frac{TBS_{LBRM}}{Z \cdot R_{LBRM} \cdot C}\right\rfloor\right)$$

In some embodiments, an effective number of columns (each column of length Z) in the circular buffer after LBRM is applied may be given by the formula below, a similar formula and/or other formula.

$$n_{b,LBRM} = \min\left(\frac{k_b}{R_{BG}}, \left\lfloor\frac{TBS_{LBRM}}{Z \cdot R_{LBRM} \cdot C}\right\rfloor\right)$$

In some embodiments, when LBRM is not applied, the redundancy versions for HARQ RVs {0, 1, 2, 3} at {0, 17, 33, 56}×Z for BG1 and {0, 13, 25, 43}×Z for BG2, and when LBRM is applied, they may be scaled and still aligned to the shift size Z. In some embodiments, RV1 may be given by the formula below, a similar formula and/or other formula.

$$RV1 = \left\lfloor\left(\frac{17}{66 \cdot Z}\right) \cdot \min\left(\frac{K}{R_{BG}}, \left\lfloor\frac{TBS_{LBRM}}{R_{LBRM} \cdot C}\right\rfloor\right)\right\rfloor \cdot Z \text{ or}$$

$$\left\lceil\left(\frac{17}{66 \cdot Z}\right) \cdot \min\left(\frac{K}{R_{BG}}, \left\lfloor\frac{TBS_{LBRM}}{R_{LBRM} \cdot C}\right\rfloor\right)\right\rceil \cdot Z$$

In some embodiments, in the above, either a floor or ceiling operation may be used. In some embodiments, other RVs may be similarly scaled. Alternatively, it may be expressed in terms of the effective number of columns to start at the value below, a similar value and/or other value.

$$\left\lfloor\frac{17 \cdot n_{b,LBRM}}{66}\right\rfloor \cdot Z \text{ or } \left\lceil\frac{17 \cdot n_{b,LBRM}}{66}\right\rceil \cdot Z$$

In some embodiments, in the above, either a floor or ceiling operation may be used. In some embodiments, other RVs may be similarly scaled.

In some embodiments, application of LBRM may be performed so as to avoid any ambiguity issues between the transmitter and receiver, although the scope of embodiments is not limited in this respect. In some cases, LBRM may not necessarily be applied. Such cases may include, but are not limited to: an initial access phase, wherein the network may not be fully aware of UE capability with respect to a component carrier; cases in which the network is transmitting broadcast information that may need to be received by any UE 102 (which may include UEs 102 with different capabilities); and/or other case(s).

For instance, the LBRM may not necessarily be applied to common messages scheduled via SI-RNTI, P-RNTI, RA-RNTI, and/or other. In some embodiments, such messages may have relatively smaller packet sizes, and may not necessarily have stringent processing requirements that would need reduction of LDPC decoding latency. For UE-specific messages, the network may assume a reference minimum configuration that a UE 102 may apply to packets scheduled on the common search space, which can be based on the default BWP or the initial access BWP. For UE-specific messages, the LBRM could be applied per transport block or per-HARQ process, wherein a HARQ process may contain up to two transport blocks.

For uplink, the LBRM can be enabled using RRC signaling. In some embodiments, the UE 102 may not necessarily apply LBRM (for instance, the UE 102 may utilize full buffer rate-matching) until it is configured to apply LBRM. Once this is enabled, the UE 102 may apply the LBRM based on the configuration parameters which may be based on uplink capabilities of the UE 102 (which may be inferred or derived from UE signaling), network configuration for uplink transmission, uplink bandwidth parts, and/or other. In some embodiments, LBRM transport block sizes may be different for uplink and downlink, although the scope of embodiments is not limited in this respect.

In some embodiments, a reference transport block size may also be derived from a peak data rate supported by the UE 102 for the component carrier. For instance, the reference transport block size may be inferred from the band/band combination signalling, and using a reference time duration. For example, if the UE 102 is capable of supporting 2 Gbps based on its band/band combination signalling for a carrier, then the maximum TBS could be determined based on the reference time duration, such as a slot duration (which is 14 OFDM symbols for a given numerology) and/or other. For example, with 30 kHz SCS, the slot duration is 0.5 ms, which when combined with 2 Gbps yields $2*1e9*0.5*1e-3=1$ million bits of reference TBS for LRBM. If the band/band combination indicates the data rate is based on a maximum of two codewords, then the LBRM per transport block could be based on reference TBS that is 50% of 1 million bits (that is, 500,000).

In some embodiments, a reference LBRM TBS can be defined for a limited granularity such as a limited set of resource allocations, (such as {25, 50, 100, 200, 275} PRBs and/or other). Then a UE 102 may determine the reference LBRM TBS by comparing its BWP or CC or configured maximum BWP and selecting the nearest or next highest resource allocation as its reference. For example, if a configured maximum BWP for the UE 102 is 128 PRBs, then the UE 102 may select the 100 PRBs or 200 PRBs as the value for determining the reference TBS for LBRM.

In some embodiments, there may be a minimum value of TBS below which LBRM may not be applied for uplink or for downlink. The reference minimum value of TBS can be determined based on a limited set of resource allocations (such as {25, 50, 100, 200, 275} PRBs and/or other). Then a UE 102 may determine the reference minimum LBRM TBS by selecting the 25 PRBs as the value for determining the reference minimum TBS for LBRM. In some embodiments, there may also be an assumption on DMRS, number of spatial layers, and/or other, and a potential adjustment may be made based on LDPC shift size and base graph to obtain an estimate of this.

In some embodiments, for a given link, the LBRM may be applied on messages scheduled via specific DCI formats and/or messages scheduled via specific search spaces.

Non-limiting example flow charts 1100, 1120, 1140, 1160 are shown in FIG. 11. Another non-limiting example flow chart 1200 is shown in FIG. 12. In some embodiments, the UE 102 may perform some or all operations of one or more of the flow charts 1100, 1120, 1140, 1160 and/or 1200. In some embodiments, the UE 102 may perform one or more operations that may be the same as one or more operations shown in FIG. 11 and/or FIG. 12. In some embodiments, the UE 102 may perform one or more operations that may be similar to one or more operations shown in FIG. 11 and/or FIG. 12. In some embodiments, the UE 102 may perform one or more operations that may be reciprocal to one or more operations shown in FIG. 11 and/or FIG. 12. In some embodiments, the gNB 105 may perform some or all operations of one or more of the flow charts 1100, 1120, 1140, 1160 and/or 1200. In some embodiments, the gNB 105 may perform one or more operations that may be the same as one or more operations shown in FIG. 11 and/or FIG. 12. In some embodiments, the gNB 105 may perform one or more operations that may be similar to one or more operations shown in FIG. 11 and/or FIG. 12. In some embodiments, the gNB 105 may perform one or more operations that may be reciprocal to one or more operations shown in FIG. 11 and/or FIG. 12. Some embodiments may not necessarily include all operations shown in FIG. 11 and/or FIG. 12. Embodiments are not limited to the chronological order shown in FIG. 11 and/or FIG. 12. In some embodiments, the UE 102 and/or gNB 105 may perform one or more operations not shown in FIG. 11 and/or FIG. 12.

In some embodiments, a method for transmission of a packet to a device (such as a UE 102 and/or other device) may be performed by the gNB 105. One or more of the following operations may be performed. The gNB 105 may acquire device reception capability information. The gNB 105 may determine parameters for applying a limited buffer rate-matching for the packet based on the device capability information. The gNB 105 may encode the packet using a coding scheme to obtain an encoded packet; apply limited buffer rate-matching to the encoded packet. The gNB 105 may transmit the LBRM-applied encoded packet; and/or other operation(s). In some embodiments, a parameter for applying a limited buffer rate-matching may include a reference transport block size determined based on maximum configured bandwidth part for reception at the device. In some embodiments, the reference transport block size may be further determined based on one or more of: a reference number of spatial layers; reference pilot overhead; reference resource allocation; a reference subcarrier spacing; and/or other. Some embodiments may not necessarily include all of the above operations. Some embodiments may include one or more additional operations. Embodiments are not limited to the chronological order given above.

In some embodiments, a method for reception of a packet from a device (such as a UE 102 and/or other device) may be performed by the gNB 105. One or more of the following operations may be performed. The gNB 105 may acquire device transmitter capability information. The gNB 105 may determine parameters for applying a type of rate-matching for the packet at the device transmitter. The gNB 105 may transmit configuration information including information related to application of a type of rate-matching for encoding a packet at the device. In some embodiments, the configuration information may include, for limited buffer rate-matching, a reference transport block size determined based on a maximum configured bandwidth part for transmission from the device. The gNB 105 may receive the rate-matched encoded packet from the device; and/or other operation(s). In some embodiments, the reference transport block size may be further determined based on one or more of: a reference number of spatial layers, reference pilot overhead, reference resource allocation, a reference subcarrier spacing and/or other. In some embodiments, the type of rate-matching may be full buffer rate-matching or limited buffer rate-matching. In some embodiments, the gNB 105 may decode the received rate-matched encoded packet, and may transmit a retransmission request based on the result of decoding. Some embodiments may not necessarily include all of the above operations. Some embodiments may include one or more additional operations. Embodiments are not limited to the chronological order given above.

In some embodiments, a method for reception of a packet from a device (such as a gNB 105 and/or other device) may be performed by the UE 102. One or more of the following operations may be performed. The UE 102 may transmit device reception capability information. The UE 102 may acquire parameters related to a limited buffer rate-matching applied for the packet. The UE 102 may receive an LBRM-applied encoded packet. In some embodiments, the packet may be encoded based on a coding scheme. In some embodiments, a parameter for applying a limited buffer rate-matching may include a reference transport block size determined based on maximum configured bandwidth part for reception at the device. In some embodiments, the reference transport block size may be further determined based on one or more of: a reference number of spatial layers, reference pilot overhead, reference resource allocation, a reference subcarrier spacing and/or other. In some embodiments, the UE 102 may decode the received LBRM-applied encoded packet. In some embodiments, the UE 102 may transmit feedback based on the result of decoding. Some embodiments may not necessarily include all of the above operations. Some embodiments may include one or more additional operations. Embodiments are not limited to the chronological order given above.

In some embodiments, a method for transmission of a packet to a device (such as a gNB 105 and/or other device) may be performed by the UE 102. One or more of the following operations may be performed. The UE 102 may transmit device transmitter capability information. The UE 102 may receive configuration information, which may include one or more of: information related to application of a type of rate-matching for encoding the packet at the device; configuration information for limited buffer rate-matching; a reference transport block size (which may be determined based on a maximum configured bandwidth part for transmission from the device and/or other, in some embodiments); and/or other information. The UE 102 may encode a packet using a coding scheme to obtain an encoded packet. The UE 102 may apply limited buffer rate-matching to the encoded packet based on configuration information. The UE 102 may transmit the LBRM-applied encoded packet. In some embodiments, the reference transport block size may be further determined based on one or more of: a reference number of spatial layers, reference pilot overhead, reference resource allocation, a reference subcarrier spacing and/or other. In some embodiments, the type of rate-matching may be full buffer rate-matching or limited buffer rate-matching. Some embodiments may not necessarily include all of the above operations. Some embodiments may include one or more additional operations. Embodiments are not limited to the chronological order given above.

In some embodiments, next generation wireless communication system, 5G, or new radio (NR) may be used. In some embodiments, NR may provide a unified network/system that targets to meet vastly different and sometime conflicting performance dimensions and services. Such diverse multi-dimensional requirements may be driven by different services and applications. In general, NR may evolve based on 3GPP LTE-Advanced with additional potential new Radio Access Technologies (RATs).

In some cases, the NR use case families, eMBB and ultra-reliable and low latency communications (URLCC) may have very different requirements in terms of user plane latency, required coverage levels and/or other factor(s). In some cases, key requirements for URLLC may relate to U-plane latency and reliability. In a non-limiting example, for URLLC, the target for user plane latency may be 0.5 ms for UL, and 0.5 ms for DL. In another non-limiting example, a target for reliability may be $1 \times 10^{-5}$ within 1 ms. Embodiments are not limited to the example values given above.

In some cases, a challenge for NR design may be to enable efficient multiplexing of the eMBB and URLLC services in the same spectrum. The reason is that both services may require large bandwidth (i.e. tens of MHz) but may have different latency requirements that limit applicability of simple frequency domain multiplexing and may lead to the necessity of time domain multiplexing approaches. In some embodiments, semi-static partitioning of resources in time domain may be used by allocating certain resources for URLLC and eMBB. However, this technique may suffer from low efficiency and peak data rate losses of both eMBB and URLLC services, in some cases. Therefore, dynamic multiplexing approaches may be desired for efficient operation of both URLLC and eMBB services in one spectrum.

In some embodiments, to enable dynamic multiplexing, URLLC transmission may preempt an ongoing eMBB transmission. For instance, the resource elements already scheduled for eMBB may be punctured. To help the UE 102 to perform proper soft combining of the corrupted initial transmission and the retransmission due to puncturing of eMBB data, the UE 102 may be informed by the preempted resource via Preemption Indication (PI). In FIG. 13, a non-limiting example of dynamic multiplexing of eMBB and URLLC is shown, wherein preempted resource is used for the transmission of control and/or data channel for URLLC application.

In some embodiments, including but not limited to cases in which 3GPP, NR, and/or 5G is used, the following may be applicable. In some embodiments, a fixed payload size (excluding CRC and potential reserved bits) of the group-common DCI carrying the downlink pre-emption indication (PI), in the format of a bitmap is used to indicate preempted resources within the semi-statically configured DL reference resource. The bitmap indicates for one or more frequency domain parts (N>=1) and/or one or more time domain parts (M>=1). There may not necessarily be RRC configuration involved in determining the frequency or time-domain parts. The following combinations are supported and predefined {M, N}={14, 1}, {7, 2}. A combination of {M,N} from this set of possible {M,N} is indicated 1 bit by RRC configuration for a UE 102.

In some embodiments, the number of partitions may be derived from the typical number of symbols in a slot since NR supports 14 OFDM symbols in a slot in case of normal CP for all subcarrier spacings. However, in 60 kHz SCS, there may be an extended CP format defined which has 48 symbols per millisecond, i.e. 12 symbols per slot. Therefore, methods to enable ECP case may be used. Moreover, how these bits in the bitmap relate to a reference DL resource also may be clarified.

In some embodiments, techniques may be used to partition reference DL resource and to map the partitions to the indicated bitmap. One or more of the following may be used: partitioning of the reference DL resource onto time-frequency partitions for arbitrary number of symbols; mapping of bitmap bits to partitions; technique(s) to handle extended CP cases; and/or other.

In some embodiments, the following combinations of number of time partitions M and frequency partitions N may be used: {M, N}={14, 1}; and {M, N}={7, 2}. Embodiments are not limited to usage of these numbers, as some or all techniques, operations and/or methods described herein may be used when other values of M and N are used, in some embodiments.

In some embodiments, the number of partitions may be derived from the typical number of symbols in a slot since NR supports 14 OFDM symbols in a slot in case of normal CP for all subcarrier spacings. However, in 60 kHz SCS, there is an extended CP format defined which has 48 symbols per millisecond, i.e. 12 symbols per slot. Therefore, methods to enable ECP case may be used. Moreover, how these bits in the bitmap relate to a reference DL resource also may be clarified.

In some embodiments, a timing relation between CORESET for PI DCI monitoring and RDR may be used. In some embodiments, the reference DL resource duration may be equal to a monitoring periodicity (which may be referred to herein as "P" symbols) while the minimum monitoring periodicity for PI may be one slot. In this case, the exact position of RDR relative to instance of PI DCI reception (i.e. PI DCI CORESET occasion) may not necessarily be clearly defined.

In some embodiments, the reference DL resource may start at the starting symbol of PI DCI CORESET and may end before (including but not limited to right before) the starting symbol of the next PI DCI CORESET occasion. A non-limiting example 1400 of this is illustrated in FIG. 14. Such an approach may be applicable for cases of slot-level monitoring periodicity and PI DCI CORESET configured in the beginning of the slot.

In some embodiments, the RDR may start after (including but not limited to right after) the last symbol of PI DCI CORESET and may end at the last symbol of the next PI DCI CORESET occasion. A non-limiting example 1450 of this is illustrated in FIG. 14. Such an option may be applicable in cases in which PI DCI CORESET is configured in the end of the slot.

In some embodiments, since both options (illustrated in FIG. 14) may be valid in different cases, a potentially universal solution is to have a configurable offset between start/end of PI DCI CORESET and the start/end of the reference DL resource. This offset may be configured semi-statically by RRC signaling since the monitoring configuration is also semi-static.

In some embodiments, if the slot-level monitoring periodicity is deemed sufficient for PI DCI, then the RDR may be derived as the slots between two PI DCI monitoring occasions. Furthermore, the RDR could be defined to span from end of the previous PI DCI CORESET (not including the CORESET symbols) to the start of the current PI DCI CORESET (again, not including the CORESET symbols). That is, the RDR may not necessarily include the symbols corresponding to the CORESET in which the UE 102 monitors for the PI DCI. This could be helpful at least for the M=14 case, since if the symbols corresponding to CORESET are pre-empted, then likely the PI DCI itself is also affected. The benefit is in terms of smaller granularity of the time domain indication using M bits.

However, for M=7 case, preemption may happen in the RDR corresponding to the other frequency partition without impacting the PI DCI. Thus, as an alternative to the option of excluding the PI DCI CORESET from the RDR, the UE 102 may assume that only the PI DCI is valid even if the corresponding symbols are indicated as being preempted by the same PI DCI. This can address use cases in which the actual preemption is less than the entire active DL BWP and excludes at least one candidate in the corresponding CORESET to transmit the PI DCI, but when M=14 is configured. This UE assumption can be limited to only the PI DCI or could be extended to all DCIs that the UE 102 detects within symbols indicated as being preempted.

It should be noted that in some protocols (including but not limited to 5G, NR, 3GPP, 3GPP LTE and/or other), reference DL resource may contain UE BWP. However, in case of BWP adaptation in which the UE 102 needs to switch BWPs within PI monitoring periodicity, certain UE behavior may need to be defined. In one option, in case of BWP adaptation, the UE 102 may ignore PI corresponding to the time when it was in a different BWP. Alternatively, given that preempted resource mainly targets for URLLC application where wide frequency resource is typically used in order to meet reliability requirement, in case of BWP adaptation, the UE 102 may assume activated BWP (before or after BWP adaptation) is within the frequency region of reference DL resource. In other words, frequency region of reference DL resource for pre-emption indication is the activated DL BWP regardless of BWP adaptation. Therefore, the UE 102 does not take any PI into account for symbols unless the UE 102 is scheduled with PDSCH for these symbols in the same BWP as the one in which it monitors the PI DCI.

In some embodiments, procedures to interpret the bitmap to identify the preempted parts within the reference DL resource may be used. some protocols (including but not limited to 5G, NR, 3GPP, 3GPP LTE and/or other), for the reference DL resource, its duration may be equal to the PI monitoring periodicity and the frequency span may be equal to the active UE downlink bandwidth part. In the time domain, semi-statically configured UL resources may be excluded from the reference DL resource. Given that the duration of UL part is flexibly configurable, the number of symbols within the configured periodicity may not necessarily be a multiple of 7 or 14. In such cases, methods to partition the reference DL resource onto M parts for arbitrary number of symbols may be used.

In some protocols (including but not limited to 5G, NR, 3GPP, 3GPP LTE and/or other), a fixed bit-field size indicating a bitmap of preempted partitions within a reference DL resource may lead to an assumption that the DCI for PI contains 14 bit for the bitmap which indicates punctured time-frequency partitions. In some embodiments, indexing of bits within the bitmap may be used. In some embodiments, the bits in the bitmap may be indexed starting from Most Significant Bit (MSB). In such cases, index '0' may correspond to MSB and index '13' may correspond to Least Significant Bit (LSB) as it is shown in 1500 in FIG. 15. As an option, the bitmap may be indexed starting from LSB. In such cases, index '0' may correspond to LSB and index '13' may correspond to MSB.

Assuming the bits in the bitmap are indexed according to one of the embodiments described above, the corresponding mapping of bitmap bits to time-frequency partitions of the reference DL resource may be performed. First, the case of time only configuration is considered, wherein {M, N}={14, 1} (that is, 14 partitions in time with no granularity in frequency). A whole active DL BWP may be assumed to be indicated within the time partition. For further discussion, it may be assumed that the reference DL resource (RDR) contains 'P' symbols of current numerology associated with the active DL BWP. Then, one or more of the following equations, similar equations and/or other equations may be used to calculate the indexes of symbols which correspond to each partitions may be used. In the can be exploited. In the following, $b_i$ is an index of a bit in the bitmap (wherein i=0, 1, ..., M−1), and $s_j$ is an index of a symbol in the reference DL resource (wherein j=0, 1, ..., P−1). In some embodiments, partitioning of resources may be done following a principle that partitions have disjoint resources (that is, no partitions contain resources of other partition).

In some embodiments, if P<M, the i-th bit in the bitmap may correspond to the i-th symbol in RDR (wherein i=0, 1, ..., P−1). That is, only P bits from the bitmap may be used in such cases. A non-limiting example 1520 is shown in FIG. 15. The remaining M−P bits in the bitmap may be unused and may be set to default value (such as '0'). This may be considered a truncated bitmap, in some embodiments.

As an option when P<M, the shorter bitmap may be repeated until the end of RDR. An example 1540 is illustrated in FIG. 15. Although there is no additional information carried by the bitmap, this option may be one of alternatives. This may be considered a repeated indication, in some embodiments.

In some embodiments, if P≥M, P symbols of RDR may be distributed over M bits of the bitmap as much uniform as possible. This principle may be described by the following equations. In the following, $l_0$=floor (P/M) is a first length of a time partition, $l_1$=floor (P/M)+1 is a second length of a time partition, $a_0$ is a number of partitions of the first length $l_0$, $a_1$ is a number of partitions of the second length $l_1$ (may be 0 if P modulo M=0), and M=$a_0$+$a_1$, (that is, the overall number of partitions is equal to the time domain length of the bitmap M). From the above conditions, $a_0$=M−(P modulo M), and $a_1$=P modulo M. Therefore, each i-th bit $b_i$ in the bitmap may correspond to a partition of length $l_0$ or $l_1$ symbols. If P is an integer multiple of M (that is, P mod M=0), then there is no partitions of second length $l_1$ (that is, $a_1$=0). The partitions of different lengths $l_0$ and $l_1$ can be distributed over the reference DL resource by one or more of the following methods and/or other methods.

In some embodiments, partitions of length $l_0$ may be placed contiguously in the beginning of RDR and partitions of length $l_1$ may be placed contiguously in the end of RDR. A non-limiting example 1560 of this is illustrated in FIG. 15. The example 1560 may illustrate a contiguous distribution of partition lengths in reference DL resource, in some embodiments.

In some embodiments, partitions of length $l_1$ may be placed contiguously in the beginning of RDR and partitions of length $l_0$ may be placed contiguously in the end of RDR. A non-limiting example 1580 of this is illustrated in FIG. 15. The example 1580 may illustrate a contiguous distribution of partition lengths in reference DL resource, in some embodiments.

In some embodiments, partitions of both lengths may be uniformly distributed within the whole RDR. This may be needed to distribute partitions with different resolution within the reference DL resource. One example of distributed $l_1$ and $l_0$ is shown in the non-limiting example 1600 in FIG. 16, with M=14. In 1600, each row corresponds to the bitmap of length M. Different rows correspond to different sizes of reference DL region (wherein different number of partitions of length $l_1$ is assumed from $a_1$=0 to M−1). Furthermore, positions of $l_1$-length partitions are colored following the principle of quasi-uniform distribution of $l_0$ and $l_1$ within the RDR. Note, similar distributions may be achieved for the case of M=7 as shown in 1650 in FIG. 16.

Additionally, the illustrated distribution of partitions is captured in the table below. The table may illustrate positions of partitions with second length $l_1$ within the reference DL resource for different values of $a_1$, in some embodiments.

| $a_1$ | 1 | 2 | 3 | 4 | 5 | 6 | 7 | 8 | 9 | 10 | 11 | 12 | 13 |
|---|---|---|---|---|---|---|---|---|---|---|---|---|---|
| Positions of $l_1$-length partitions | 13 | 6 | 3 | 2 | 1 | 1 | 1 | 1 | 1 | 1 | 1 | 1 | 1 |
| | | 13 | 8 | 6 | 4 | 3 | 3 | 2 | 2 | 2 | 2 | 2 | 2 |
| | | | 13 | 9 | 7 | 6 | 5 | 4 | 4 | 3 | 3 | 3 | 3 |
| | | | | 13 | 10 | 8 | 7 | 6 | 5 | 5 | 4 | 4 | 4 |
| | | | | | 13 | 10 | 9 | 8 | 7 | 6 | 6 | 5 | 5 |
| | | | | | | 13 | 11 | 9 | 8 | 8 | 7 | 6 | 6 |
| | | | | | | | 13 | 11 | 10 | 9 | 8 | 8 | 7 |
| | | | | | | | | 13 | 11 | 10 | 9 | 9 | 8 |
| | | | | | | | | | 13 | 12 | 11 | 10 | 9 |
| | | | | | | | | | | 13 | 12 | 11 | 10 |
| | | | | | | | | | | | 13 | 12 | 11 |
| | | | | | | | | | | | | 13 | 12 |
| | | | | | | | | | | | | | 13 |

Alternatively, a hybrid option of grouping of same length partitions and distribution of them across the reference DL resource may be achieved as illustrated in FIG. 17 for M=14 (1700) and M=7 (1750). In some cases, benefits of such an approach may include nested structure and/or common mechanism for M=14 and M=7. The table below may illustrate positions of partitions with second length $l_1$ within the reference DL resource for different values of $a_1$, in some embodiments.

| $a_1$ | 1 | 2 | 3 | 4 | 5 | 6 | 7 | 8 | 9 | 10 | 11 | 12 | 13 |
|---|---|---|---|---|---|---|---|---|---|---|---|---|---|
| Positions of $l_1$-length partitions | 13 | 6 | 6 | 5 | 5 | 2 | 2 | 1 | 1 | 1 | 1 | 1 | 1 |
| | | 13 | 12 | 6 | 6 | 5 | 5 | 2 | 2 | 2 | 2 | 2 | 2 |
| | | | 13 | 12 | 9 | 6 | 6 | 5 | 5 | 4 | 4 | 3 | 3 |
| | | | | 13 | 12 | 9 | 8 | 6 | 6 | 5 | 5 | 4 | 4 |
| | | | | | 13 | 12 | 9 | 8 | 8 | 6 | 6 | 5 | 5 |
| | | | | | | 13 | 12 | 9 | 9 | 8 | 8 | 6 | 6 |
| | | | | | | | 13 | 12 | 11 | 9 | 9 | 8 | 7 |
| | | | | | | | | 13 | 12 | 11 | 10 | 9 | 8 |
| | | | | | | | | | 13 | 12 | 11 | 10 | 9 |
| | | | | | | | | | | 13 | 12 | 11 | 10 |
| | | | | | | | | | | | 13 | 12 | 11 |
| | | | | | | | | | | | | 13 | 12 |
| | | | | | | | | | | | | | 13 |

As a further alternative option, the bitmap M may be assumed repeated over P symbols. That is, each bit in the bitmap may correspond to all symbols i=j+M·m, wherein j is a bit index in the bitmap and m=0, . . . , ceil(P/M)−1 is the index of bitmap repetition over RDR.

In another approach to distribute partitions of different length, a condition whether any partition spans a slot boundary may be utilized. For example, a consecutive partitioning as in one or more of the above options may be assumed as a starting point. Then, if there is any partition which spans through a slot boundary then the partition mapping may be cyclically shifted or swapped until there is no any partition spanning slot boundary. That is, the partition crossing slot boundary or its neighboring partition may be swapped with the partition of another length. In case there is frequency domain indication granularity configured, (such as {M, N}={7, 2} and/or other), mechanisms to partition in frequency and also how to map time-frequency partitions to the signaled bitmap may be used, in some embodiments.

In some embodiments, including but not limited to cases in which 3GPP, NR, and/or 5G is used, the following may be applicable. In some cases, there may be at most 2 partitions. In this case, different approaches of mapping the time-frequency partitions to the bitmap may be used. In some embodiments, the mapping may be time-first. That is, indexes of time partitions may be increasing with the increase of bit index in the bitmap. After reaching the last time partition within a particular frequency, the time index is reset and the frequency index is incremented. This approach is illustrated in 1850 in FIG. 18. In some embodiments, the mapping may be frequency-first. That is, indexes of frequency partitions may be increasing with the increase of bit index in the bitmap and reset every two bits with increasing time domain index. A non-limiting example 1800 is illustrated in FIG. 18. In some cases, the frequency-first approach may be more suitable for cases when P<M and the bitmap may need to be truncated. When truncated, consecutive bits may be dropped if needed.

In some embodiments, techniques to divide the frequency bandwidth into two parts for the case of {M, N}={7, 2} may be used. In some embodiments, the total number of PRBs in the active DL bandwidth part may be divided equally. That is, assuming there are B PRBs of a given numerology associated with particular BWP, the first frequency partition may comprise floor (B/2) PRBs, and the second partition may comprise remaining [B−floor (B/2)] PRBs. Alternatively, the first partition may comprise ceil (B/2) PRBs, and the second partition may comprise remaining [B−ceil (B/2)] PRBs.

In some embodiments, an extended cyclic prefix may be used. In some embodiments, including but not limited to cases in which 3GPP, NR, and/or 5G is used, the following may be applicable. Values for M=[7, 14] may fit to slot duration of 14 symbols, which is the case for normal CP. However, for 60 kHz subcarrier spacing there may be an extended CP option available for configuration. There may be 12 extended CP OFDM symbols comprising a slot. In some embodiments, this case may be handled by the mechanisms described above for P M. For example, if P=12 and M=14, the bitmap may be truncated. That is, 2 bits may be considered unused. In another example, if P=12 and M=7, the mechanism of partitioning into unequal parts may be used as in other embodiments and/or cases described herein.

In some embodiments, another set of {M, N} which correspond to ECP case may be used. The set may be used in dynamic indication and may be configured via RRC by 1 bit field. Non-limiting examples include {M, N}={12, 1}, and {M, N}={6, 2}. In some embodiments, the UE 102 may identify which particular set to use depending on the configured CP for a given bandwidth part and the RRC signaled index of the set among the two specified.

In some embodiments, a system and/or method of spectrum resources partitioning for DL preemption indication in wireless communication for a fifth generation (5G) or new radio (NR) system may be used. In some embodiments, the gNB 105 may configure time and frequency reference resource region for application of pre-emption indication. In some embodiments, the gNB 105 may indicate time and frequency resource by a pre-emption indication. In some embodiments, the gNB 105 may transmit the pre-emption indication using a group common downlink control information (DCI). In some embodiments, the reference DL resource may start at the starting symbol of PI DCI CORE-SET and may end right before the starting symbol of the next PI DCI CORESET occasion. In some embodiments, the reference DL resource may always start at the starting symbol of PI DCI CORESET and may end right before the starting symbol of the next PI DCI CORESET occasion. In some embodiments, the reference DL resource may start right after the last symbol of PI DCI CORESET and may end at the last symbol of the next PI DCI CORESET occasion. In some embodiments, the start/end of PI DCI CORESET and the start/end of the reference DL resource may be offset to each other. In some embodiments, a value of the offset may be configured semi-statically by RRC signaling. In some embodiments, the preempted time-frequency resource indication may be a bitmap of length L in a DCI carrying preemption indication. In some embodiments, L=M*N, wherein M is a number of time partitions and N is a number of frequency partitions.

In some embodiments, bits in the bitmap may be indexed starting from Most Significant Bit (MSB). In some embodiments, index '0' may correspond to MSB and index 'L−1' may correspond to Least Significant Bit (LSB). In some embodiments, the bits in the bitmap may be indexed starting from LSB. In some embodiments, index '0' may correspond to LSB and index 'L−1' may correspond to MSB.

In some embodiments, the reference DL resource may comprise P symbols of a given numerology. In some embodiments, if P is smaller than M and the i-th bit in the bitmap corresponds to i-th symbol in the reference DL resource (wherein i=0, 1, . . . , P−1, and only P bits from the bitmap are used), remaining M−P bits in the bitmap may be unused and may be set to a default value (such as '0' and/or other). In some embodiments, a bitmap of length P may be repeated to compose an M-length bitmap.

In some embodiments, if P is equal to or larger than M, then P symbols of the reference DL resource may be distributed over M bits of the bitmap as much uniform as possible according to the following equations. The parameter $l_0$=floor (P/M) is a first length of a time partition; the parameter $l_1$=floor (P/M)+1 is a second length of a time partition; the parameter $a_0$ is a number of partitions of the first length $l_0$; the parameter $a_1$ is a number of partitions of the second length $l_1$ (may be 0 if P modulo M=0); the parameter M=$a_0$+$a_1$ is an overall number of partitions, and may be equal to the time domain length of the bitmap M. From the above conditions, one or more of the following may be used: $a_0$=M−(P modulo M); $a_1$=P modulo M.

In some embodiments, each i-th bit $b_i$ in the bitmap may correspond to a partition of length $l_0$ or $l_1$ symbols. In some embodiments, partitions of length $l_0$ may be placed contiguously in the beginning of the reference DL resource and partitions of length $l_1$ may be placed contiguously in the end of reference DL resource.

In some embodiments, partitions of length $l_1$ may be placed contiguously in the beginning of the reference DL resource and partitions of length $l_0$ may be placed contiguously in the end of reference DL resource. In some embodiments, partitions of both lengths may be uniformly distributed within the whole reference DL resource.

In some embodiments, the bitmap M may be repeated over P symbols. That is, each bit in the bitmap may correspond to all symbols i=j+Mm, wherein j is a bit index in the bitmap, wherein m=0, . . . , ceil(P/M)−1 is an index of bitmap repetition over the reference DL resource.

In some embodiments, in cases in which a number of frequency domain partitions N is larger than 1, then the mapping of time-frequency partitions to the bitmap may be time-first. That is, indexes of time partitions may be increasing with the increase of bit index in the bitmap. After reaching the last time partition within particular frequency, the time index may be reset and the frequency index may be incremented.

In some embodiments, in cases in which the number of frequency domain partitions N is larger than 1, then the mapping may be frequency-first. That is, indexes of frequency partitions may be increasing with the increase of bit index in the bitmap and may be reset every two bits with increasing time domain index.

In some embodiments, in cases in which the bandwidth part in which PI DCI is monitored is configured with an extended CP, a new set of {M, N} (which may correspond to ECP case) may be introduced. A set to be used in dynamic indication may be configured via RRC by 1 bit field. In some embodiments, one or more of the following sets may be used: {M, N}={12, 1}; {M, N}={6, 2}; and/or other.

In some embodiments, including but not limited to embodiments in which 3GPP, 3GPP LTE and/or NR protocols are used, sidelink carrier aggregation for V2V communication may be used. In some embodiments, a single synchronization reference may be assumed for transmission across all sidelink component carriers (CCs). In some embodiments, techniques may be used to support V2V sidelink synchronization over multiple aggregated CCs.

In some embodiments, a sidelink V2V synchronization procedure may comprise one or more of the following: allocation of sidelink synchronization resources for SLSS transmission/reception across multiple aggregated sidelink component carriers (CCs); TDM multiplexing of synchronization resources with other sidelink channels (such as PSCCH, PSSCH and/or other) and resources to avoid cross-carrier leakage and transmit power sharing between SLSS transmission and other sidelink transmissions; techniques based on SLSS transmitter behavior to resolve potential conflict of SLSS and PSCCH/PSSCH transmission across multiple CCs; usage of a synchronization source selection rule used to derive timing for transmission and reception across aggregated CCs; usage of a tie breaking rule to select the synchronization reference from the set of signals having the same priority of synchronization sources; and/or other.

In some cases, one or more of the techniques, operations and/or methods described herein may enable a reduction of the UE complexity and/or improved synchronization performance for the case of sidelink carrier aggregation in application to LTE-V2V communication. Embodiments described herein are not limited to the LTE-V2V use case.

In some embodiments, different types of synchronization sources for GNSS, eNB and UE (SLSS transmission based on derived timing from GNSS, eNB, other UEs) may be used in sidelink synchronization on V2V carriers. Support of SLSS based synchronization may be up to UE capability, in some embodiments. The V2X capable UE 102 may be expected to support at least GNSS and eNB 104 as a synchronization reference, in some embodiments.

In cases in which multiple sidelink component carriers are used, technique(s) for synchronization across sidelink component carriers may be used. In some cases, synchronized and non-synchronized sidelink component carriers may exist. However, practical benefits of having non-synchronized component carriers may not be clear in some cases. Therefore, enhancements to support synchronized sidelink multi-carrier operation may be used.

In some embodiments, for synchronized sidelink component carries, common timing reference and/or synchronization source priority rules may be used across all aggregated sidelink CCs for sidelink transmission and reception. The common sync reference (e.g. GNSS, eNB, SLSS) may be used to provide synchronization in time and frequency for all aggregated CCs. In general, common DFN offset may be defined across multiple component carriers. This may be sufficient to provide all necessary functionality and flexibility in terms of resource allocation in case of eNB and GNSS based synchronization references, in some cases. In cases in which SLSS based synchronization is used, one or more of the techniques, operations and/or methods described herein may be used.

In some cases, including but not limited to cases in which multiple aggregated sidelink CCs are used, one or more of the following sidelink synchronization signals (SLSS) resource configurations may be used. In some embodiments (which may be referred to without limitation as "Option 1"), SLSS transmission using a single carrier (such as an anchor carrier as illustrated in FIG. 19 and/or other). A non-limiting example 1900 of option 1 is shown in FIG. 19. In some embodiments, multi-carrier synchronization using SLSS transmission using anchor carrier may be used. In some embodiments (which may be referred to without limitation as "Option 1a"), a system-wide anchor carrier may be used. From a system perspective, the sidelink synchronization resources can be configured in a way that only one out of N aggregated CCs is used for SLSS transmission. In such cases, only one CC may need to be scanned by RX UE 102 to detect SLSS and associated synchronization references. Given that R15 UE 102 has multiple RX chains and one of the chains may be easily tuned to anchor CC, it can simply track SLSS synchronization sources and apply it for transmission/reception across multiple aggregated CCs. This design option may be aligned with R14 UE behavior, given that the presence of synchronization resources is CC specific and may be enabled or disabled on each sidelink CC.

In some embodiments (which may be referred to without limitation as "Option 1b"), a UE-specific anchor carrier may be used. From single UE perspective, the sidelink synchronization resources can be configured on one out of N synchronous CCs at each UE 102. In this case, the UE 102 may transmit SLSS using only one CC but may still need to scan SLSS references on multiple aggregated CCs. Given that R15 UE 102 has multiple RX chains, it can detect SLSS on multiple CCs and may select one of them as a synchronization reference for transmission/reception across all aggregated CCs. The selection of synchronization reference across set of aggregated CCs may follow the R14 procedure for synchronization source selection rules, although the scope of embodiments is not limited in this respect. This rule can be extended across CCs so that the CC in which a source with the highest priority is detected may be used as synchronization reference.

In some embodiments (which may be referred to without limitation as "Option 2"), SLSS transmission over multiple carriers may be used. Sidelink synchronization resources may be configured on M out of N synchronous CCs. In this case, the following sidelink synchronization resource configurations may be used. In some embodiments (which may be referred to without limitation as "Option 2a"), the configuration may be based on usage of FDM of synchronization resources across aggregated CCs. A non-limiting example 1920 of option 2a is shown in FIG. 19. Sidelink synchronization resources may be allocated in the same subframe across multiple CCs (i.e. aligned in time) as it is shown in FIG. 19. In such cases, the UE 102 with limited TX capabilities (such as K chains) may need to be pre-configured or autonomously select subset K out of M component carriers for SLSS transmission. The UE 102 may not necessarily be mandated to transmit SLSS on all K out of M component carriers, given that it may not use all K or M CCs for sidelink communication. In this option, the UE 102 may need to select single SLSS synchronization reference for transmission and reception across M component carriers. The potential drawbacks of this option are: mutual impact of SLSS transmissions due to cross-carrier leakage among SLSS transmissions on different CCs; and shared TX power budget across CCs.

In some embodiments (which may be referred to without limitation as "Option 2b"), the configuration may be based on usage of FDM+TDM of sync resources across aggregated CCs. In Option 2b, synchronization resources on M out of N component carriers may be distributed in time. This option can potentially enable UE 102 with limited TX capabilities to transmit SLSS on multiple CCs (w/o dropping SLSS transmission) by switching from one CC to another. However, switching may cause receiver interruptions and also conflict with data transmission across selected CCs. In addition, in this option, out-of-band emission (OOBE) from SLSS transmission may mask reception of PSCCH/PSSCH on other CCs and vice versa. A non-limiting example 1940 of option 2b is shown in FIG. 19.

In some embodiments (which may be referred to without limitation as "Option 3"), synchronization resources corresponding to different synchronization references may be distributed across CCs. In this option, synchronization resources (for instance, sync resource 1, 2, 3) can be configured on different CCs (for instance, SLSS propagating timing from GNSS is transmitted on CC1 sync resources, SLSS propagating timing from eNB 104 is transmitted on CC2 sync resources, and/or other arrangements). This option may be reasonable from the perspective of sync source type differentiation. However, it may not necessarily be aligned with R14 sidelink synchronization procedure.

Considering Option 1 and Option 2a of synchronization signals resource allocation, the same DFN Offset value and syncOffsetIndicator may be used on all CCs, in some embodiments.

In some embodiments, one or more of the following modifications may be used: introduce anchor CC or aligned in time allocation of synchronization resources; use the common DFN offset and syncOffsetIndicator parameter across multiple component carriers.

In some embodiments, in order to avoid cross-carrier leakage on a set of aggregated CCs, the synchronization resource may be multiplexed in time with other sidelink transmissions on aggregated component carriers. A non-limiting example of this is shown in FIG. 20. Usage of such resource allocation may help to avoid conflict with parallel PSCCH/PSSCH data transmission on other CCs and may be beneficial at least for UEs 102 with limited TX capabilities. In some cases, FIG. 20 may illustrate TDM of sidelink sync resource with other sidelink channels across aggregated CCs.

In some embodiments, the following modification may be used: usage of TDM multiplexing of SLSS and PSCCH/PSSCH resources to avoid cross-carrier leakage and TX power sharing.

In some embodiments, in case of limited UE TX capability, (such as cases in which the UE 102 cannot transmit on multiple carriers at the same time) the UE 102 may need to switch its TX chain from one CC to another in order to transmit SLSS on configured CC. It may happen in a situation in which a TX chain of the UE 102 is tuned to another CC for PSCCH/PSSCH transmission. Depending on switching time, the retuning of TX chain to SLSS carrier may be in conflict with PSCCH/PSSCH transmission on a given carrier. In such cases, the UE 102 may use one of the following options used to resolve this conflict. The options presented below and shown in FIG. 21 (referred to as option 1, option 2 and option 3) should not be confused with options/elements of same name or similar name described elsewhere herein. In option 1, PSCCH/PSSCH transmission may be prioritized over SLSS transmission at other CCs. The UE 102 may be allowed to skip or temporally discontinue SLSS transmission on some CC if it has active TX process on another CC with or w/o SLLS resources.

In option 2, SLSS transmission may be prioritized over PSCCH/PSSCH transmission at other CCs. The UE 102 may skip PSCCH/PSSCH transmission opportunity if carrier switching to SLSS carrier could not be accomplished in time. In this case, considering persistent nature of PSSCH/PSCCH resource allocation, continuous packet drop potentially could happen. In order to handle this situation, the resource reselection may be triggered to select other resources that do not have TX and switching conflict and therefore avoid TX conflict across multiple CCs at UE 102.

In option 3, PSCCH/PSSCH resource selection procedure may be modified, and information about SLSS resource allocation and carrier switching time may be used. According to some resource (re)selection procedure(s), including but not limited to those of 3GPP, 3GPP LTE and/or NR, the resources used for SLSS transmission may be excluded from resource candidates for PSCCH/PSSCH transmission. Considering the non-negligible carrier switching time ($T_{switch}$), the additional resources before and after SLSS transmission subframes may also be excluded from the list of resources available for PSCCH/PSSCH resource selection to allow UE 102 to complete carrier switching on time and transmit PSCCH/PSSCH and SLSS signals at other carrier(s) without TX conflict.

Figure 21A:
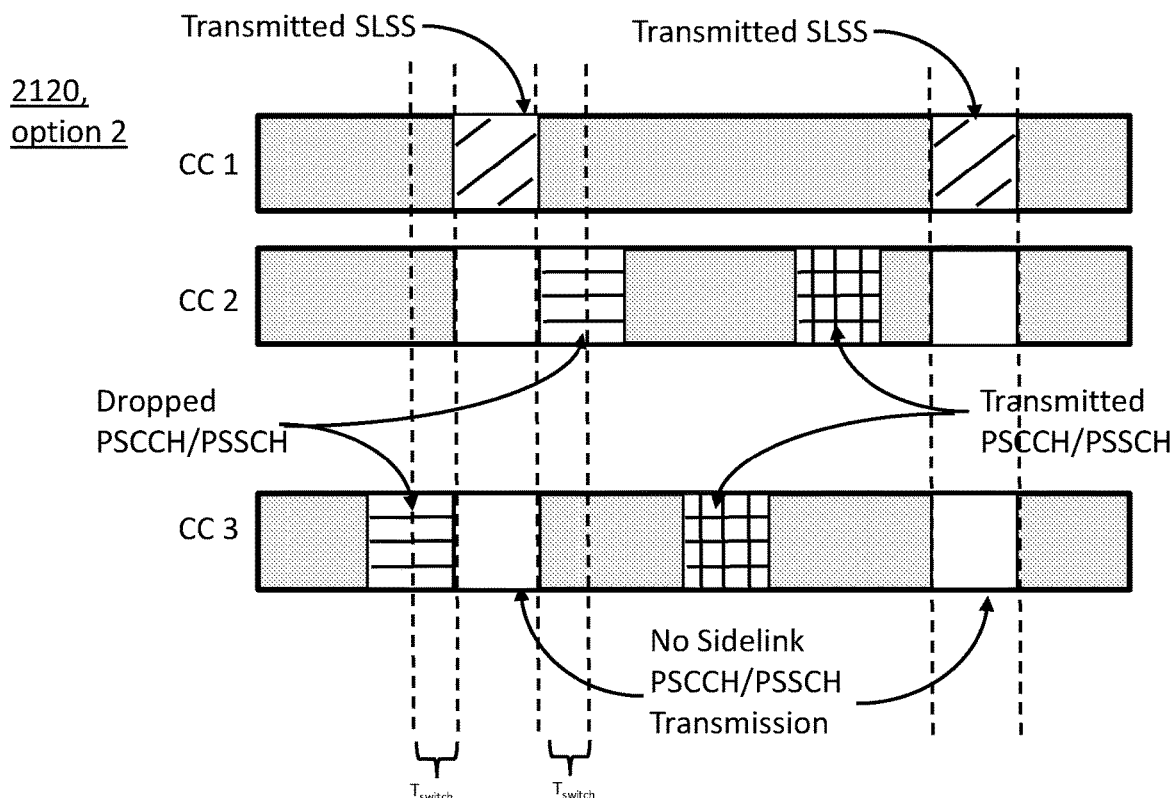
Figure 21B:
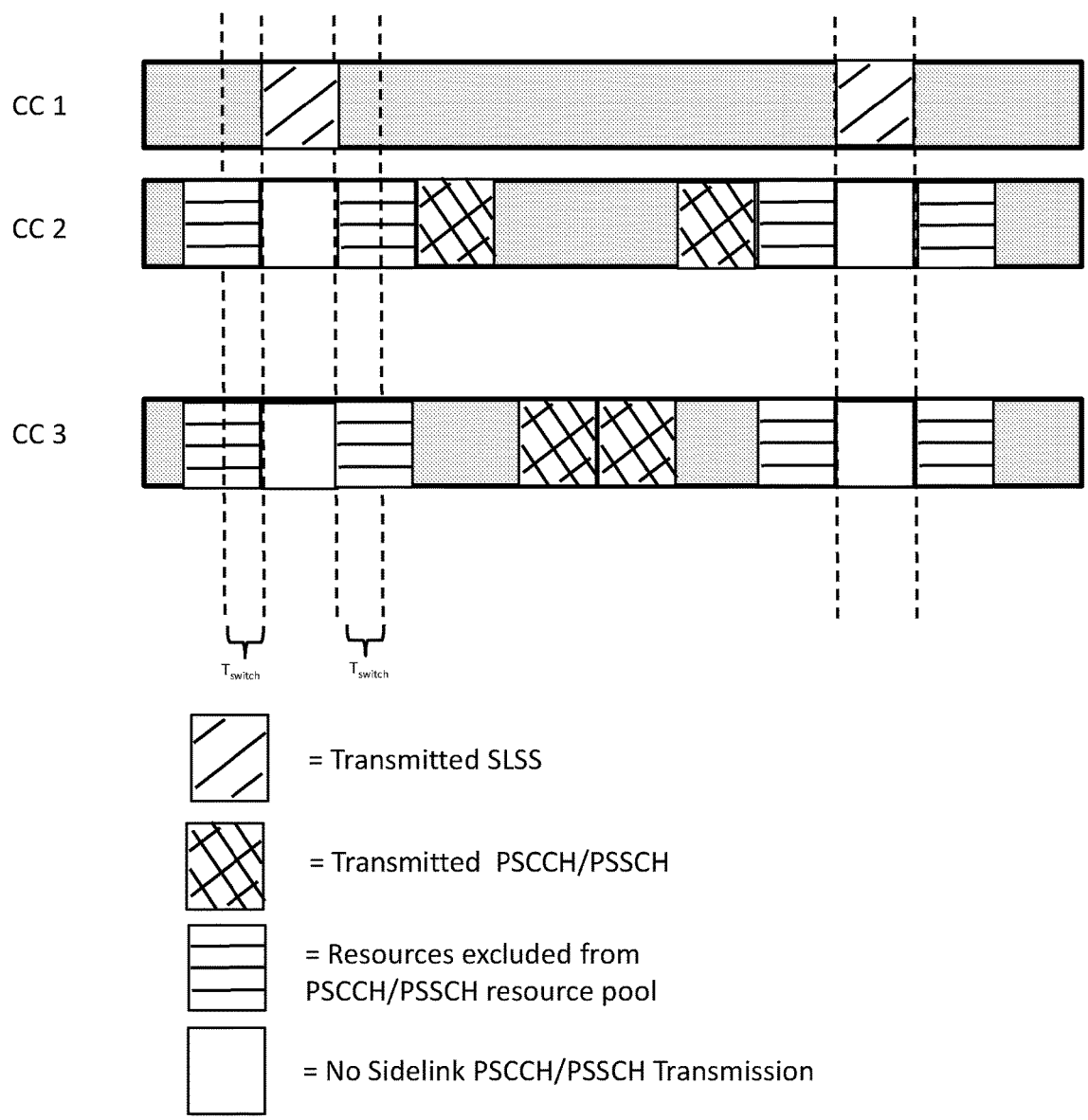

Non-limiting examples of the above options (option 1, option 2 and option 3) are shown in FIG. 21. In some cases, FIG. 21 may illustrate UE TX behavior options in case of cross-carrier SLSS and PSCCH/PSSCH transmission.

In some embodiments, the following modification may be used: specify transmitter behavior to address TX conflict of SLSS and PSCCH/PSSCH transmission in case of sidelink carrier aggregation. The solution may comprise one or more of the following options: the UE 102 always transmits SLSS on anchor CCs or only if it has transmission on any aggregated CCs; the UE 102 transmits SLSS on anchor CCs or only if it has transmission on any aggregated CCs; the UE 102 transmits SLSS on anchor CCs if it transmits PSCCH/PSSCH on the same CC; the UE 102 discontinues SLSS transmission on anchor CCs if it needs to transmit PSCCH/PSSCH on non-anchor CCs (for instance, temporally retunes to other CC); the UE 102 drops SLSS transmission on anchor CCs to prioritize PSCCH/PSSCH transmission on non-anchor CCs in case of sidelink TX conflict across CCs; the UE 102 drops PSCCH/PSSCH transmission to prioritize SLSS transmission on anchor CCs in case of sidelink TX conflict across CCs; the UE 102 avoids sidelink TX conflict through proper resource selection at non-anchor CCs taking into account TX/RX switching time across CCs that can be accomplished by excluding subframes adjacent to SLSS subframe during resource selection or resource configuration procedures; and/or other.

In some embodiments, as part of a sidelink carrier aggregation framework, a single synchronization reference may be used for all aggregated component carriers from the TX UE perspective.

At the same time from RX perspective multiple different synchronization sources may exist at different carriers. In this case, one or more of the following options can be considered for reception timing. The options presented below (referred to as option 1 and option 2) should not be confused with options/elements of same name or similar name described elsewhere herein. In option 1, synchronization source for each component carrier may be derived independently. In this case LTE R14 procedure of TX synchronization source selection could be used at any carrier independently. The main flow of this scheme lies in necessity of multiple timings tracking that may significantly increase receiver complexity. In order to avoid this complexity we propose another option (option 2, described below). In option 2 a single synchronization reference may be used for transmission/reception in all aggregated sidelink CCs. The single synchronization source selection rule across multiple CCs may be defined. In some embodiments, R14 sidelink synchronization procedure may be used and may be generalized to the case of multiple aggregated CCs. The synchronization source selection procedure may be complemented with additional tie breaking rules used to select synchronization reference among multiple CCs and in particular addresses the case of the same priority synchronization sources are detected at different CCs.

In some embodiments, the following modification may be used: specify receiver behavior wherein a common synchronization reference is used for reception at all aggregated carriers.

In some embodiments, including but not limited to embodiments in which multi-carrier SLSS synchronization is used, multiple SLSS with the same sync source may be received over multiple carriers. In such cases, some additional rule to select carrier and synchronization source for SLSS synchronization may be used. One or more of the following tie-breaking rules may be used independently or in combination to select synchronization reference in cases in which SLSS transmissions on different CCs have the same synchronization source priority. In some embodiments, a tie breaking rule may be based on SLSS resources signal strength comparison. In some embodiments, a tie breaking rule may be based on S-RSRP based on PSBCH DMRS measurements. In some embodiments, a tie breaking rule may be based on SLSS signal reception quality metric. In a non-limiting example, the estimated SNR value may be used. In another non-limiting example, the estimated SINR value may be used. In another non-limiting example, the sidelink RSRQ measurements could be used to select reference SLSS. Embodiments are not limited to these examples, as any suitable parameter(s)/element(s) may be used.

In some embodiments, a tie breaking rule may be based on synchronization signal availability metric. This metric may reflect the number of synchronization resources in which a synchronization signal was successfully detected compared with a total number of monitored synchronization resources.

In some embodiments, the following modification may be used: apply LTE R14 priority rules for synchronization source selection across multiple aggregated CCs and define tie breaking rules for sync source selection across CCs. The tie-breaking rule may be based on one or more the following options. In some embodiments, the tie breaking rule may be based on SLSS resources signal strength comparison. In some embodiments, the tie breaking rule may be based on S-RSRP based on PSBCH DMRS measurements. In some embodiments, the tie breaking rule may be based on SLSS signal reception quality metric. In a non-limiting example, the estimated SNR value may be used. In another non-limiting example, the estimated SINR value may be used. In another non-limiting example, the sidelink RSRQ measurements may be used to select reference SLSS. Embodiments are not limited to these examples, as any suitable parameter(s)/element(s) may be used. In some embodiments, the tie breaking rule may be based on synchronization signal availability metric. This metric may reflect the number of synchronization resources where synchronization signal was successfully detected compared with a total number of monitored synchronization resources. In some embodiments, a method of sidelink synchronization procedure across multiple aggregated sidelink component carriers (CCs) may comprise one or more of: transmission, by the UE 102, of a sidelink synchronization signal (SLSS); reception, by the UE 102, of sidelink synchronization signal (SLSS); selection, by the UE 102, of a synchronization source and component carrier with high priority synchronization signal to derive transmission timing for all CCs using common synchronization reference; selection, by the UE 102, of a synchronization source and component carrier with high priority synchronization signal to derive reception timing for all CCs using common synchronization reference; selection, by the UE 102, of resources for synchronization signal transmission. In some embodiments, synchronization resources for SLSS transmission may be aligned across component carriers at subframe boundaries in time and transmitted on M out of N sidelink CCs. In some embodiments, synchronization resources for SLSS transmission may be aligned across component carriers at subframe boundaries in time and may be allocated in the same subframe. In some embodiments, synchronization resources for SLSS transmission may be aligned across component carriers at subframe boundaries in time and may be allocated in a same subframe and wherein only one anchor CC is used for SLSS transmission (that is, M=1 out of N>1). In some embodiments, transmit timing on all CCs may be the same as timing used on Anchor CC.

In some embodiments, a same 'DFN offset' parameter may be used on all CCs. In some embodiments, a common 'syncOffsetIndicator' parameter may be used on all CCs. In some embodiments, SLSS transmission on Anchor CC may be prioritized over other sidelink transmission on non-Anchor CCs. In some embodiments, data transmission may be prioritized over SLSS transmission on Anchor CC. In some embodiments, resources for synchronization signals from different synchronization sources may be configured on different CCs. In some embodiments, synchronization signal transmission may be discontinued at least for the time interval of active data transmission in case of inter-CC transmission conflict. In some embodiments, SLSS transmission may be prioritized over data transmission in case of inter-CC transmission conflict. In some embodiments, data transmission may be prioritized over SLSS transmission in case of inter-CC transmission conflict. In some embodiments, data candidate resources overlapped in time with SLSS resources and TX/RX switching time intervals may be excluded from resource selection candidate sets. In some embodiments, multiple SLSS may be transmitted and received on multiple CCs and only single CC and SLSS synchronization reference with higher priority may be selected for transmission and reception.

In some embodiments, one or more additional tie-breaking rules may be defined to select one SLSS reference across aggregated CCs. One or more of the following may be used: a tie breaking rule based on SLSS resources signal strength comparison; a tie breaking rule based on S-RSRP based on PSBCH DMRS measurements; a tie breaking rule based on SLSS signal reception quality metric, wherein reception quality metric may be represented with signal-to-noise ratio, signal-to-interference plus noise ratio, RSRQ metric and/or other; a tie breaking rule based on synchronization signal availability metric; and/or other.

In Example 1, an apparatus of a User Equipment (UE) may comprise memory. The apparatus may further comprise processing circuitry. The processing circuitry may be configured to attempt to decode sidelink synchronization signals (SLSSs) received on component carriers (CCs) of a carrier aggregation. In one configuration of the carrier aggregation, synchronization resources for SLSS transmissions may be: aligned across the CCs at subframe boundaries in time, restricted to a portion of the CCs, and restricted to a same sub-frame. The processing circuitry may be further configured to, for each of the CCs on which one or more SLSSs are decoded, determine a priority level for the CC based on indicators in the SLSSs received on the CC. The processing circuitry may be further configured to select, from the CCs on which one or more SLSSs are decoded, the CC for which the determined priority level is highest. The processing circuitry may be further configured to determine a reference timing for sidelink communication based on the one or more SLSSs received on the selected CC. The memory may be configured to store information identifying the reference timing.

In Example 2, the subject matter of Example 1, wherein in another configuration of the carrier aggregation, synchronization resources for SLSS transmissions may be: aligned across the CCs at subframe boundaries in time, restricted to an anchor CC, and restricted to a same sub-frame.

In Example 3, the subject matter of one or any combination of Examples 1-2, wherein the processing circuitry may be further configured to determine the reference timing based on a timing of the anchor CC.

In Example 4, the subject matter of one or any combination of Examples 1-3, wherein: SLSS transmission on the anchor CC may be prioritized over other sidelink transmissions on other non-anchor CCs; or data transmission may be prioritized over SLSS transmission on the anchor CC.

In Example 5, the subject matter of one or any combination of Examples 1-4, wherein the processing circuitry may be further configured to encode a frame for transmission in the sidelink communication based on: a common direct frame number (DFN) for the CCs, or a common synchronization offset indicator parameter for the CCs.

In Example 6, the subject matter of one or any combination of Examples 1-5, wherein: transmission of synchronization signals may be discontinued at least for a time interval of an active data transmission if an inter-CC transmission conflict occurs; SLSS transmission may be prioritized over data transmission if an inter-CC transmission conflict occurs; or data transmission may be prioritized over SLSS transmission if an inter-CC transmission conflict occurs.

In Example 7, the subject matter of one or any combination of Examples 1-6, wherein candidate resources for data transmission that are overlapped in time with resources for SLSS transmission and transmit-receive switching time intervals may be excluded from candidate resources for SLSS transmission.

In Example 8, the subject matter of one or any combination of Examples 1-7, wherein the processing circuitry may be further configured to determine the common reception timing at the CCs.

In Example 9, the subject matter of one or any combination of Examples 1-8, wherein the processing circuitry may be further configured to, if at least two of the determined priority levels are the same as the highest priority level, select the CC further based on one or more of: a tie-breaking rule based on a comparison of signal strength of the decoded SLSSs; a tie-breaking rule based on sidelink reference signal received power (S-RSRP) based on physical sidelink broadcast channel (PSBCH) demodulation reference symbol (DMRS) measurements; a tie-breaking rule based on a signal reception quality metric based on a signal-to-noise ratio (SNR), a signal-to-interference-plus-noise ratio (SINR), or a reference signal received quality (RSRQ) metric; and a tie-breaking rule based on a synchronization signal availability metric.

In Example 10, the subject matter of one or any combination of Examples 1-9, wherein the apparatus may further include a transceiver to receive the SLSSs. The processing circuitry may include a baseband processor to decode the SLSSs.

In Example 11, a non-transitory computer-readable storage medium may store instructions for execution by one or more processors to perform operations for communication by a generation Node-B (gNB). The operations may configure the one or more processors to decode, from a User Equipment (UE), information related to reception capability of the UE, wherein the information includes a maximum modulation order or a maximum number of spatial layers for reception at the UE. The operations may further configure the one or more processors to determine, based on the received information, one or more parameters to be used for limited buffer rate-matching (LBRM) for encoding of downlink packets. One of the parameters may indicate a reference transport block size (TBS) based on the maximum configured bandwidth of downlink (DL) bandwidth parts (BWPs) configured for reception at the UE. The operations may further configure the one or more processors to encode a downlink packet for transmission to the UE. The packet may be encoded in accordance with the LBRM.

In Example 12, the subject matter of Example 11, wherein the operations may further configure the one or more processors to determine the reference TBS based on one or more of: a reference number of spatial layers, a reference pilot overhead, a reference resource allocation, and a reference subcarrier spacing.

In Example 13, the subject matter of one or any combination of Examples 11-12, wherein the reference TBS is a first reference TBS, and the LBRM is a first LBRM. The operations may further configure the one or more processors to determine, based on the received information, configuration information to be used for a second LBRM for encoding of uplink packets by the UE. The configuration information may include a second reference TBS based on a maximum configured bandwidth of uplink (UL) BWPs configured for transmission at the UE. The operations may further configure the one or more processors to encode, for transmission to the UE, a message that indicates the configuration information. The operations may further configure the one or more processors to decode an uplink packet received from the UE. The uplink packet may be decoded in accordance with the second LBRM.

In Example 14, the subject matter of one or any combination of Examples 11-13, wherein the configuration information may further include a type of rate-matching to be used for the second LBRM. The type of rate-matching may be full buffer rate-matching or LBRM.

In Example 15, the subject matter of one or any combination of Examples 11-14, wherein the operations may further configure the processing circuitry to determine the second reference TBS based on one or more of: a reference number of spatial layers, a reference pilot overhead, a reference resource allocation, and a reference subcarrier spacing.

In Example 16, an apparatus of a Generation Node-B (gNB) may comprise memory. The apparatus may further comprise processing circuitry. The processing circuitry may be configured to determine time resources and frequency resources allocated for pre-emption of traffic for transmission of higher priority traffic. The processing circuitry may be further configured to encode, for transmission, control signaling that indicates the time resources and the frequency resources allocation for the pre-emption. The processing circuitry may be further configured to encode, for transmission, a pre-emption indicator that indicates that a User Equipment (UE) is to receive a pre-empted transmission. The pre-emption indicator may be included in a group common downlink control information (DCI). The memory may be configured to store information identifying the time resources and the frequency resources allocated for the pre-emption.

In Example 17, the subject matter of Example 16, wherein the time resources allocated for the pre-emption may: start at a starting symbol of a control resource set occasion for pre-emption indication DCI monitoring; and end immediately before a starting symbol of a next control resource set occasion for pre-emption indication DCI monitoring.

In Example 18, the subject matter of one or any combination of Examples 16-17, wherein the time resources allocated for the pre-emption may: start immediately after a final symbol of a control resource set occasion for pre-emption indication DCI monitoring; and end at a final symbol of a next control resource set occasion for pre-emption indication DCI monitoring.

In Example 19, the subject matter of one or any combination of Examples 16-18, wherein the pre-emption indicator may include a bitmap of size equal to a product of a number of time partitions and a number of frequency partitions.

In Example 20, the subject matter of one or any combination of Examples 16-19, wherein if a number of frequency partitions is greater than one, a frequency-first mapping may be used for the frequency resources allocated for the pre-emption. For the frequency-first mapping, an index of the frequency partitions may increase with an increase in bit indexes in the bitmap.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
   memory; and
   processing circuitry in communication with the memory, wherein the processing circuitry is configured to:
      decode one or more sidelink synchronization signals (SLSSs) received on one or more carriers;
      for each of the one or more carriers on which the one or more SLSSs are decoded, determine a priority level for a carrier based on an indicator in one or more respective SLSSs received on the carrier;
      select, from the one or more carriers on which one or more SLSSs are decoded, the carrier for which the determined priority level is highest; and
      determine a reference timing for sidelink communication based on the one or more SLSSs received on the selected carrier.

2. The apparatus of claim 1,
   wherein the one or more carriers are one or more component carriers (CCs) in a carrier aggregation configuration.

3. The apparatus of claim 2,
   wherein synchronization resources for the SLSSs are assigned across the one or more CCs at subframe boundaries in time, restricted to a portion of the one or more CCs, and restricted to a common sub-frame.

4. The apparatus of claim 1,
   wherein at least one of the one or more carriers does not include SLSSs.

5. The apparatus of claim 1,
   wherein the processing circuitry is further configured to:
      determine a reference timing based on a timing of an anchor carrier of the one or more carriers.

6. The apparatus of claim 1,
   wherein the processing circuitry is further configured to:
      encode a frame for transmission in the sidelink communication based on:
         a common direct frame number (DFN) for the one or more carriers; or
         a common synchronization offset parameter for the one or more carriers.

7. The apparatus of claim 1,
   wherein the processing circuitry is further configured to:
      determine a common reception timing of the one or more carriers.

8. The apparatus of claim 1,
   wherein the processing circuitry is further configured to:
      when at least two determined priority levels corresponding to at least two carriers of the one or more carriers are the same as a highest priority level, select from the corresponding at least two carriers based on a comparison of signal strength of the one or more decoded SLSSs.

9. The apparatus of claim 1, further comprising:
   a transceiver to receive the one or more carriers; and
   one or more antennas coupled to the transceiver.

10. A method for determining a reference timing for sidelink communication, comprising:
   a user equipment (UE),
      decoding one or more sidelink synchronization signals (SLSSs) received on one or more component carriers (CCs);
      for each of the one or more CCs on which the one or more SLSSs are decoded, determining a priority level for a CC based on an indicator in one or more respective SLSSs received on the CC;
      selecting, from the one or more CCs on which one or more SLSSs are decoded, the CC for which the determined priority level is highest; and
      determining the reference timing for sidelink communication based on the one or more SLSSs received on the selected CC.

11. The method of claim 10,
   wherein synchronization resources for the SLSSs are assigned across the one or more CCs at subframe boundaries in time, restricted to a portion of the one or more CCs, and restricted to a common sub-frame.

12. The method of claim 10,
   wherein at least one of the one or more CCs does not include SLSSs.

13. The method of claim 10, further comprising:
   the UE,
      determining a reference timing based on a timing of an anchor carrier of the one or more CCs.

14. The method of claim 10, further comprising:
   the UE,
      encode a frame for transmission in the sidelink communication based on:
         a common direct frame number (DFN) for the one or more CCs; or
         a common synchronization offset parameter for the one or more CCs.

15. The method of claim 10, further comprising:
the UE,
  determine a common reception timing of the one or more CCs.

16. The method of claim 10, further comprising:
the UE,
  when at least two determined priority levels corresponding to at least two CCs of the one or more CCs are the same as a highest priority level, select from the corresponding at least two CCs based on a comparison of signal strength of the one or more decoded SLSSs.

17. A user equipment (UE) comprising:
a transceiver to receive one or more component carriers (CCs);
one or more antennas coupled to the transceiver; and
processing circuitry in communication with the transceiver and configured to perform operations including:
  decoding one or more sidelink synchronization signals (SLSSs) received on the one or CCs via the transceiver;
  for each of the one or more CCs on which the one or more SLSSs are decoded, determining a priority level for a CC based on an indicator in one or more respective SLSSs received on the CC;
  selecting, from the one or more CCs on which one or more SLSSs are decoded, the CC for which the determined priority level is highest; and
  determining a reference timing for sidelink communication based on the one or more SLSSs received on the selected CC.

18. The UE of claim 17,
wherein synchronization resources for the SLSSs are assigned across the one or more CCs at subframe boundaries in time, restricted to a portion of the one or more CCs, and restricted to a common sub-frame.

19. The UE of claim 17,
wherein at least one of the one or more CCs does not include SLSSs.

20. The UE of claim 17,
the processing circuitry further configured to perform operations including:
  determining a reference timing based on a timing of an anchor carrier of the one or more CCs.

* * * * *